Figure 5:
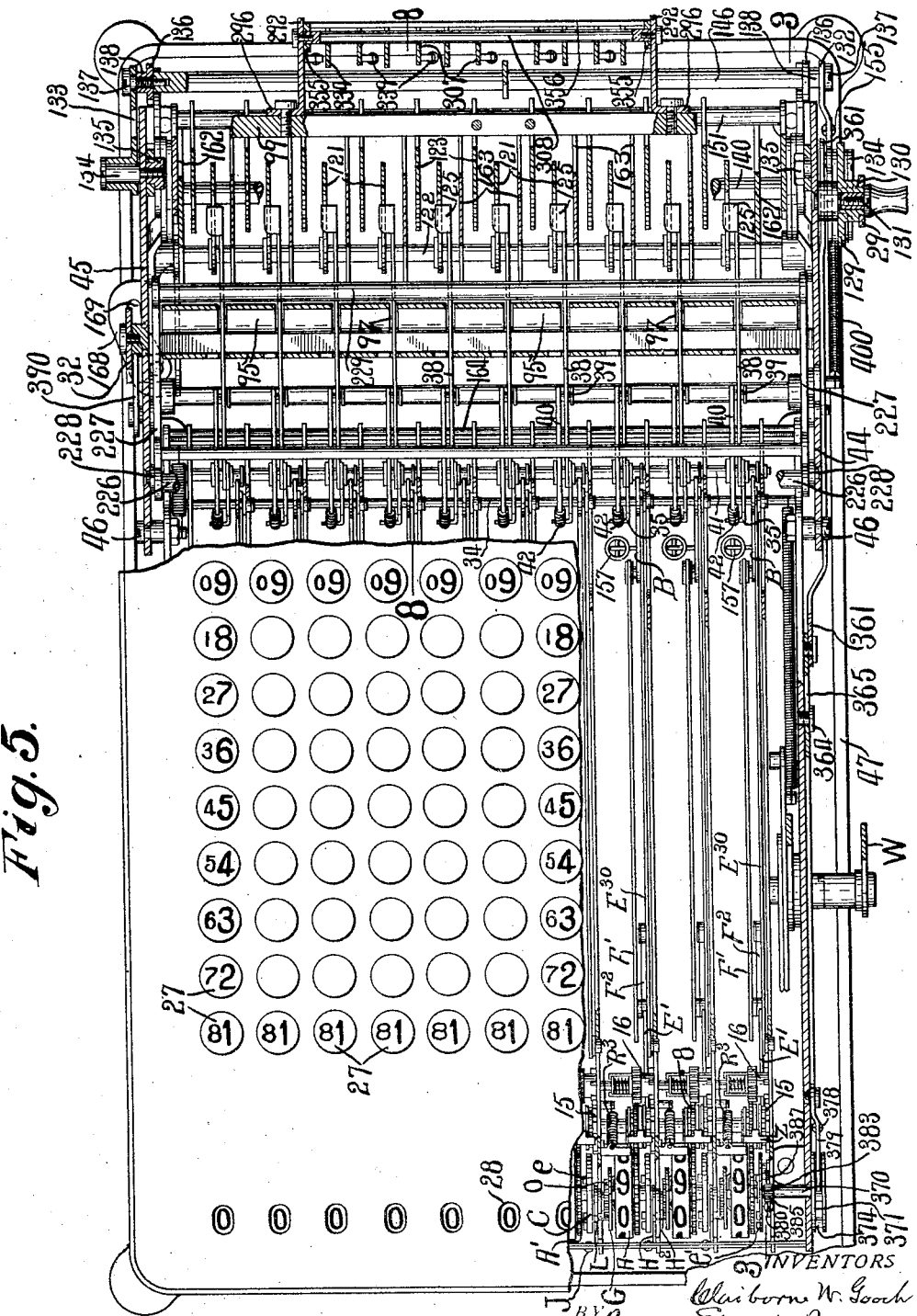

April 28, 1931. C. W. GOOCH ET AL 1,802,974
CALCULATING MACHINE
Filed Aug. 18, 1923  11 Sheets-Sheet 1
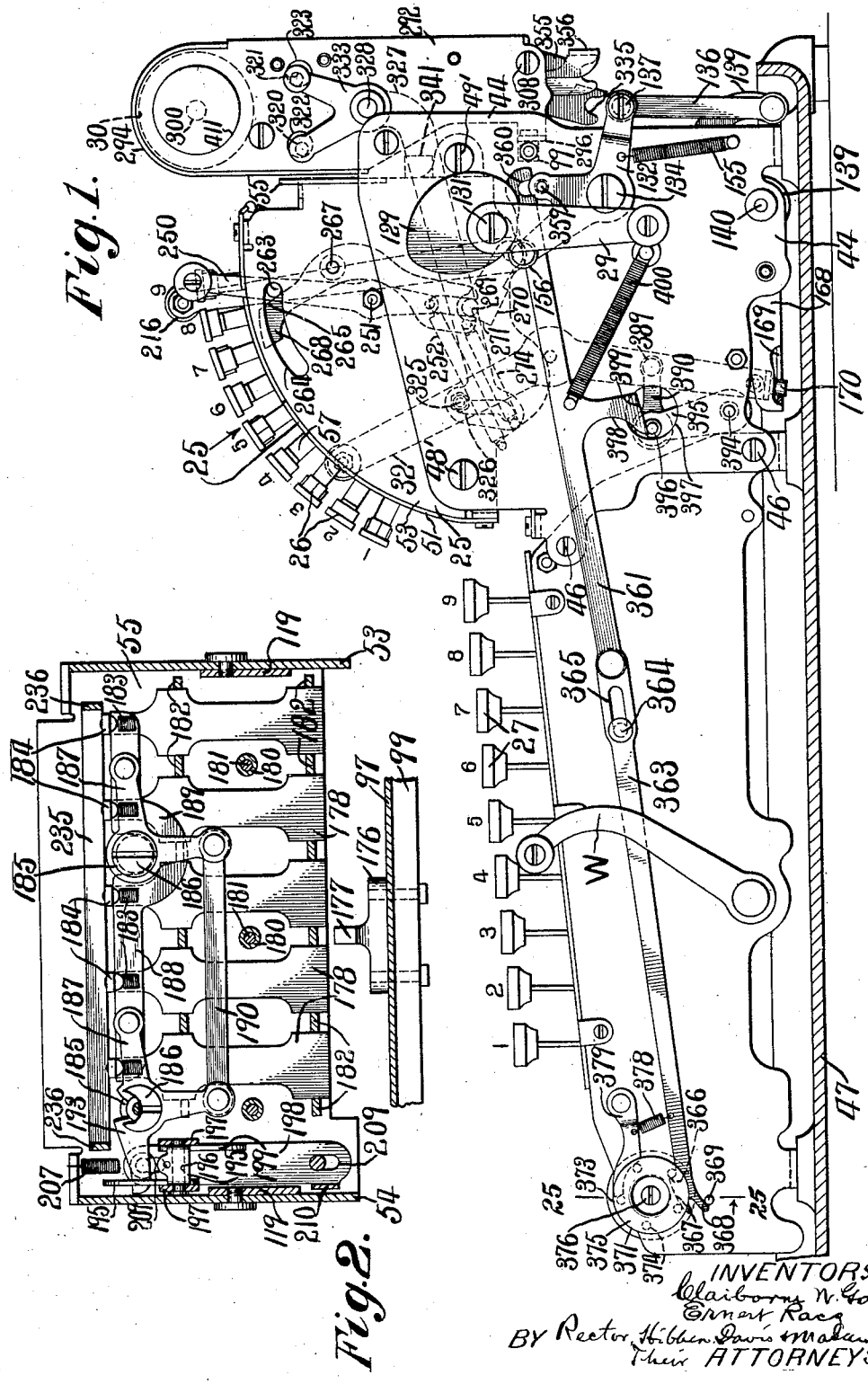

April 28, 1931.  C. W. GOOCH ET AL  1,802,974
CALCULATING MACHINE
Filed Aug. 18, 1923    11 Sheets-Sheet 2
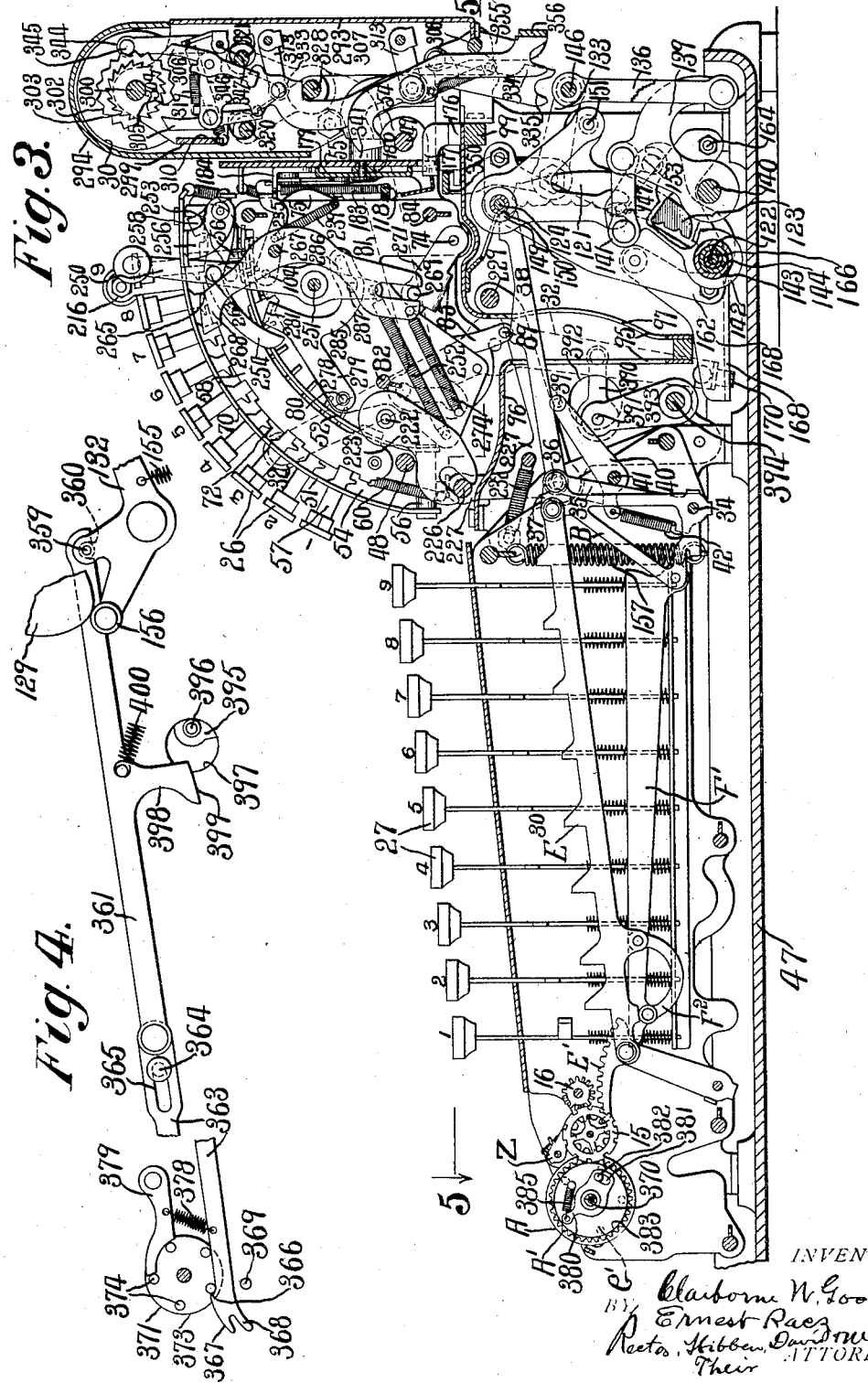

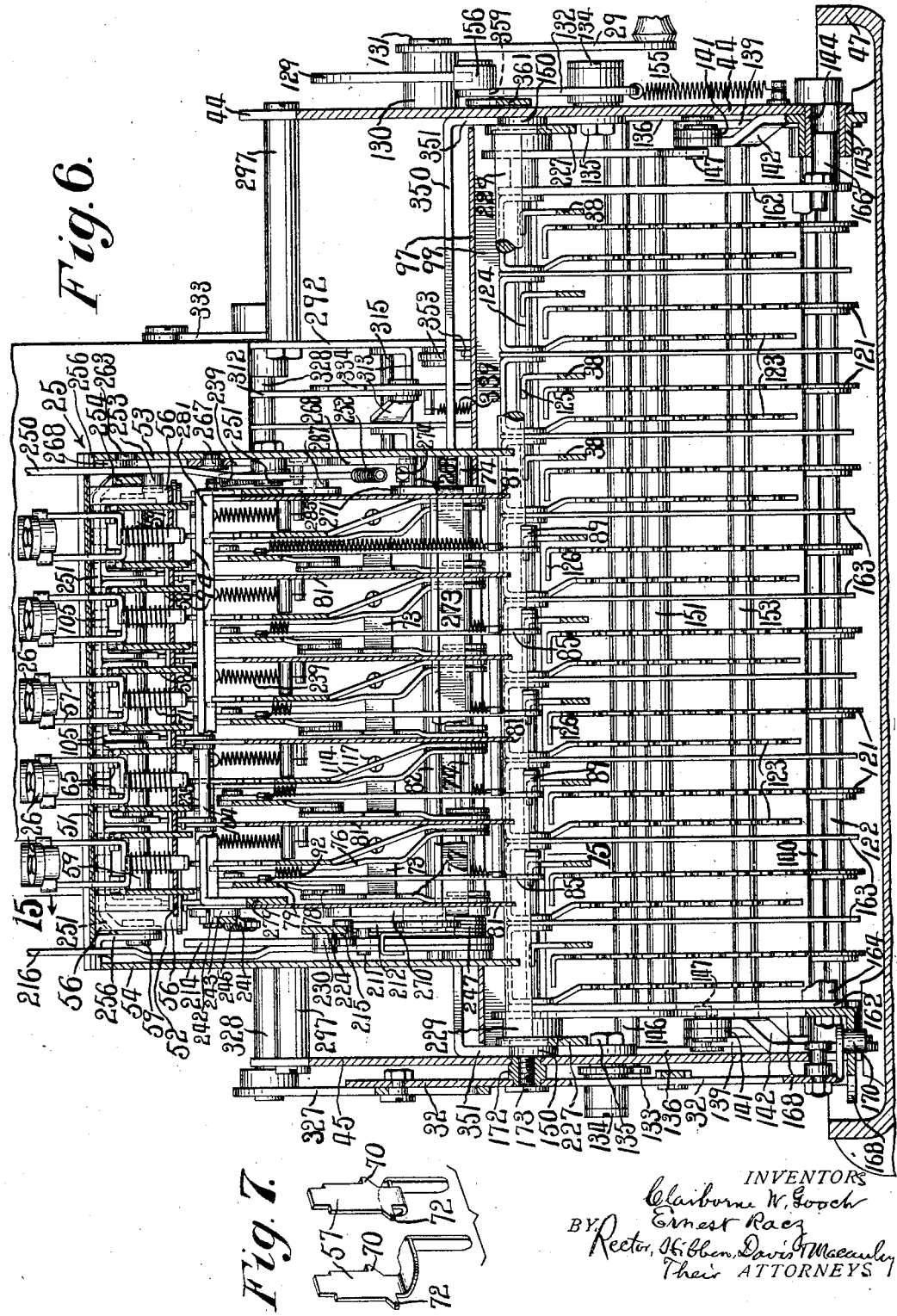

April 28, 1931.   C. W. GOOCH ET AL   1,802,974
CALCULATING MACHINE
Filed Aug. 18, 1923    11 Sheets-Sheet 5

INVENTORS
Claiborne W. Gooch and
Ernest Racz
BY Rector, Hibben, Davis & Macauley
ATTORNEYS

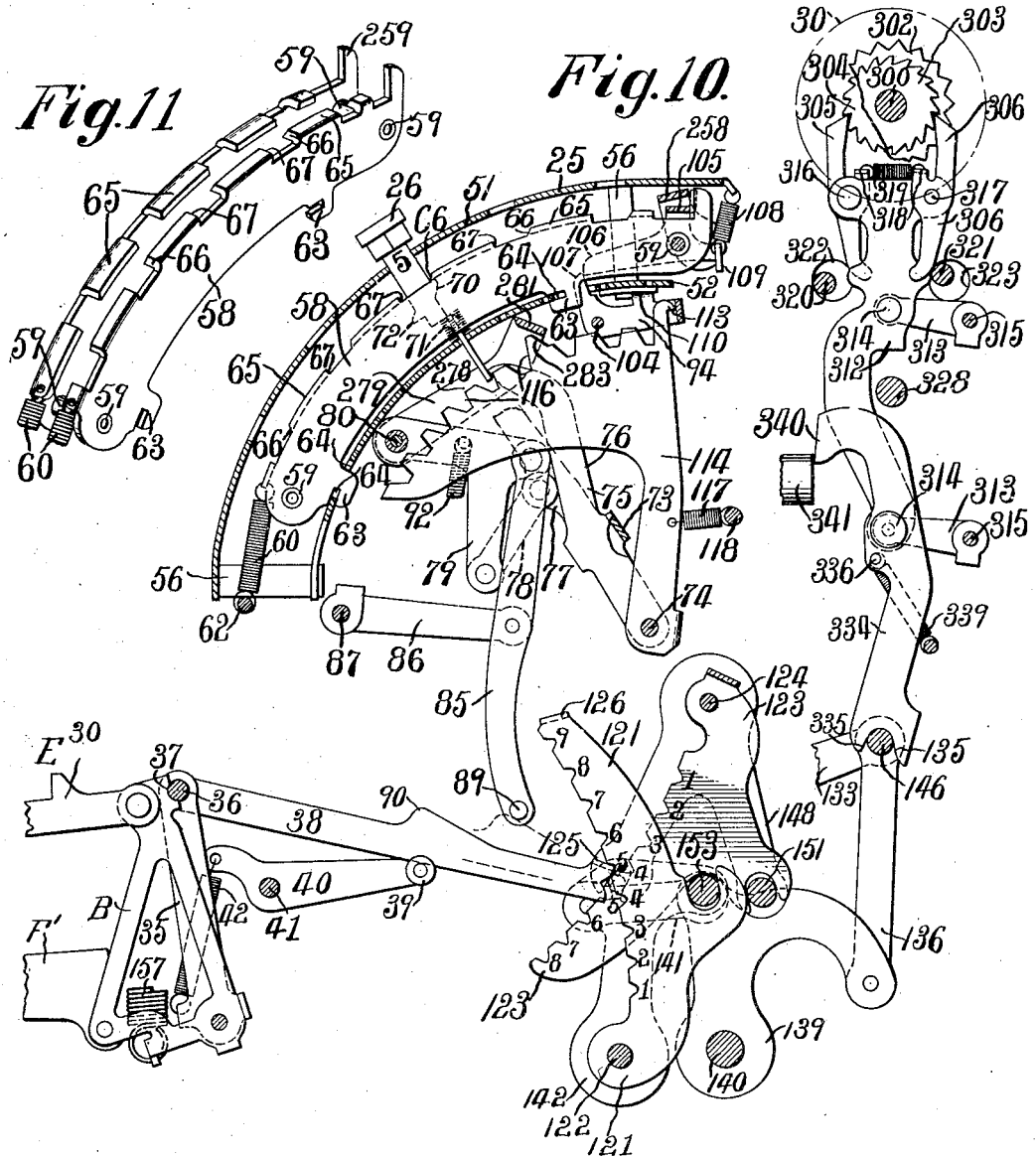
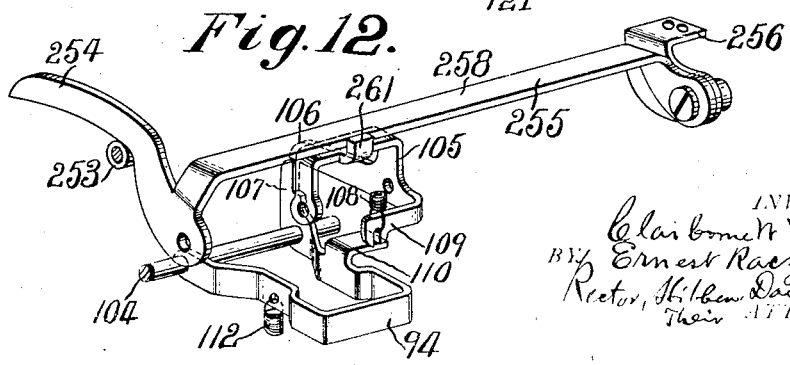

April 28, 1931. C. W. GOOCH ET AL 1,802,974
CALCULATING MACHINE
Filed Aug. 18, 1923 11 Sheets-Sheet 7

INVENTORS
Claiborne W. Gooch
BY Ernest Racz
Rector, Hibben, Davis & Macauley
Their ATTORNEYS April 28, 1931.  C. W. GOOCH ET AL  1,802,974
CALCULATING MACHINE
Filed Aug. 18, 1923   11 Sheets-Sheet 8

INVENTORS
Claiborne W. Gooch
Ernest Racs
BY
Rector, Hibben, Davis & Macauley
Their ATTORNEYS April 28, 1931.  C. W. GOOCH ET AL  1,802,974
CALCULATING MACHINE
Filed Aug. 18, 1923   11 Sheets-Sheet 9
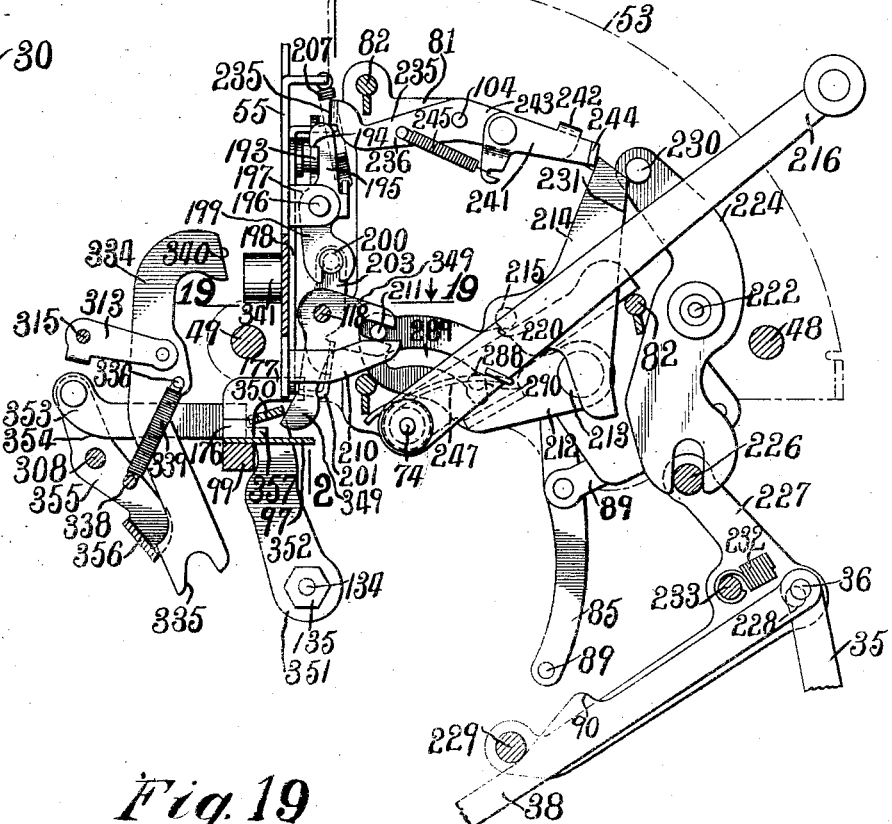
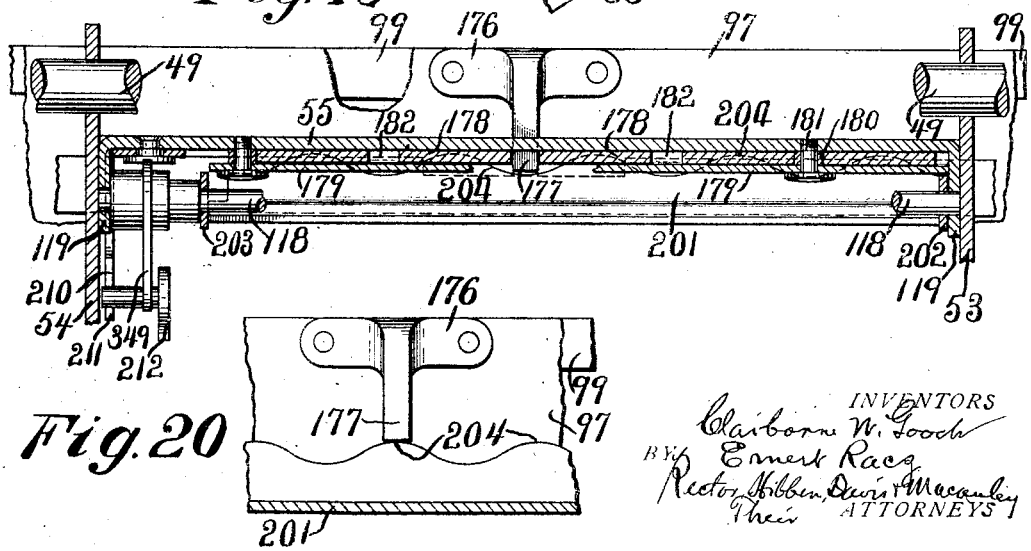

April 28, 1931.  C. W. GOOCH ET AL  1,802,974
CALCULATING MACHINE
Filed Aug. 18, 1923    11 Sheets-Sheet 10

INVENTORS
Claiborne W. Gooch
Ernest Racz
BY Rector, Hibben, Davis & Macauley
Their ATTORNEYS April 28, 1931.    C. W. GOOCH ET AL    1,802,974
CALCULATING MACHINE
Filed Aug. 18, 1923    11 Sheets-Sheet 11
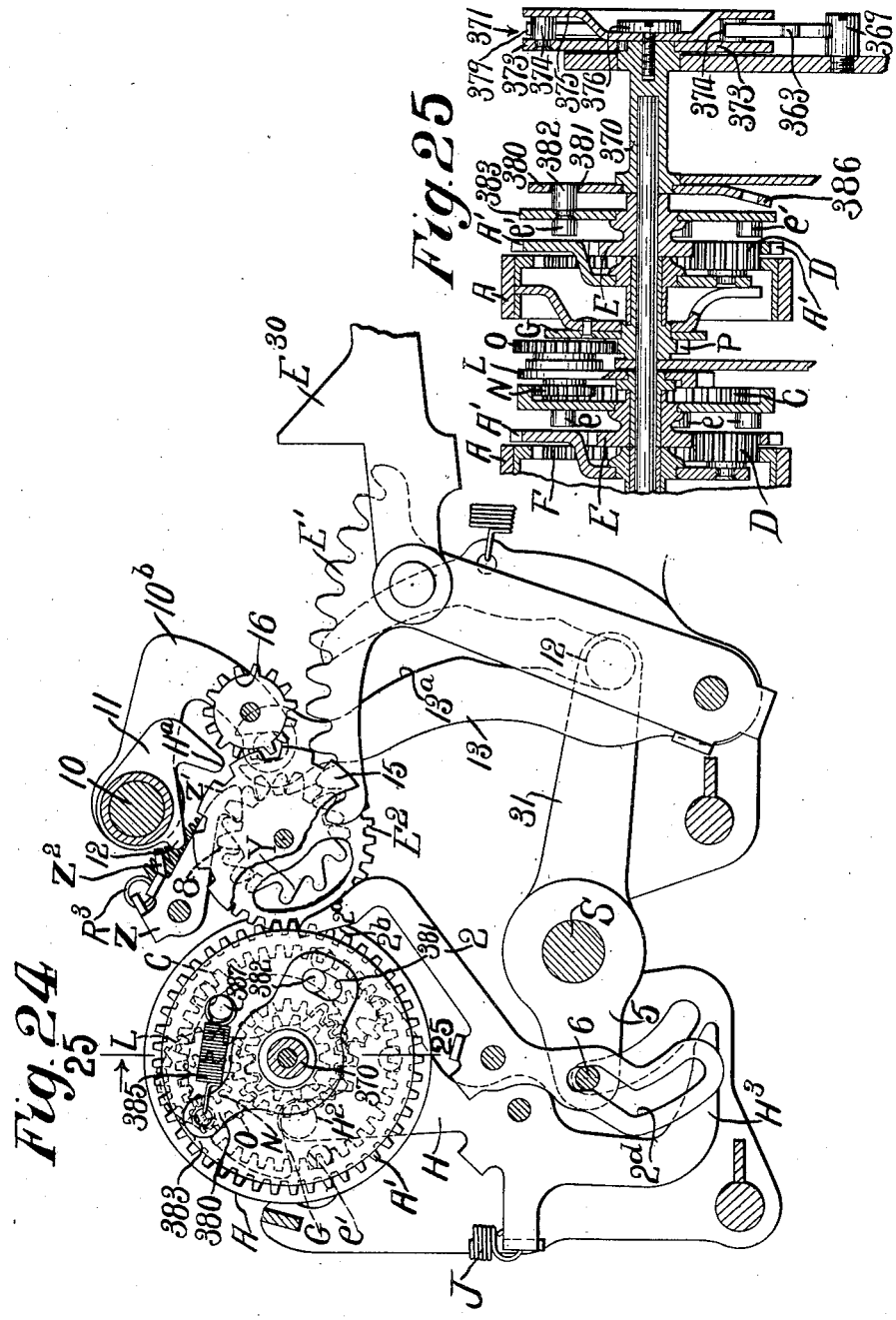

Patented Apr. 28, 1931

1,802,974

UNITED STATES PATENT OFFICE

CLAIBORNE W. GOOCH, OF LYNCHBURG, VIRGINIA, AND ERNEST RACZ, OF DETROIT, MICHIGAN, ASSIGNORS TO BURROUGHS ADDING MACHINE COMPANY, OF DETROIT, MICHIGAN, A CORPORATION OF MICHIGAN

CALCULATING MACHINE

Application filed August 18, 1923. Serial No. 658,181.

This invention relates to calculating machines, and more particularly to the type adapted expeditiously to perform calculations involving multiplication and division, as well as perform the simpler computations of addition and subtraction.

The principal objects of our invention are to equip an existing commercial form of calculating machine with an attachment adapted to cooperate with the calculating machine in performing calculations of multiplication and division and constructed to permit the calculating machine to be used independently to perform its ordinary operations of addition and subtraction; to embody in the multiplying and dividing attachment a novel form of driving mechanism for differentially propelling the actuators of the accumulator, which driving mechanism comprises complementally arranged driving arms, selectively effective and adapted to move the actuators differential extents directly proportional to the value of amount-determining manipulative devices set to represent one factor of a multiplying problem and to move the actuators extends complementary to the value of the amount-determining manipulative devices set to represent one factor of a division problem; to provide an arrangement whereby the arms for driving the actuators in a multiplying operation move the actuators which are not controlled by the amount-determining manipulative means set to represent one factor of a division problem, nine steps to add "9" on the corresponding accumulator elements during each stroke or cycle of operation of the machine; to provide a keyboard, comprising denominational banks of depressible keys, for setting up one of the factors of either a multiplying or dividing problem, and shiftable to trans-set or transpose this factor from order to order dependent upon the number of places or denominations represented in the other factor of the problem; and to provide a novel mechanism for adding "1" on the units accumulator element during each stroke of the machine when performing the process of division.

With the above and incidental objects in view, the invention consists in certain novel features of construction and combination of parts, the essential elements whereof are recited in the appended claims, and one form of embodiment of which is described in detail hereinafter and illustrated in full in the accompanying drawings which form part of this specification.

Figure 8:
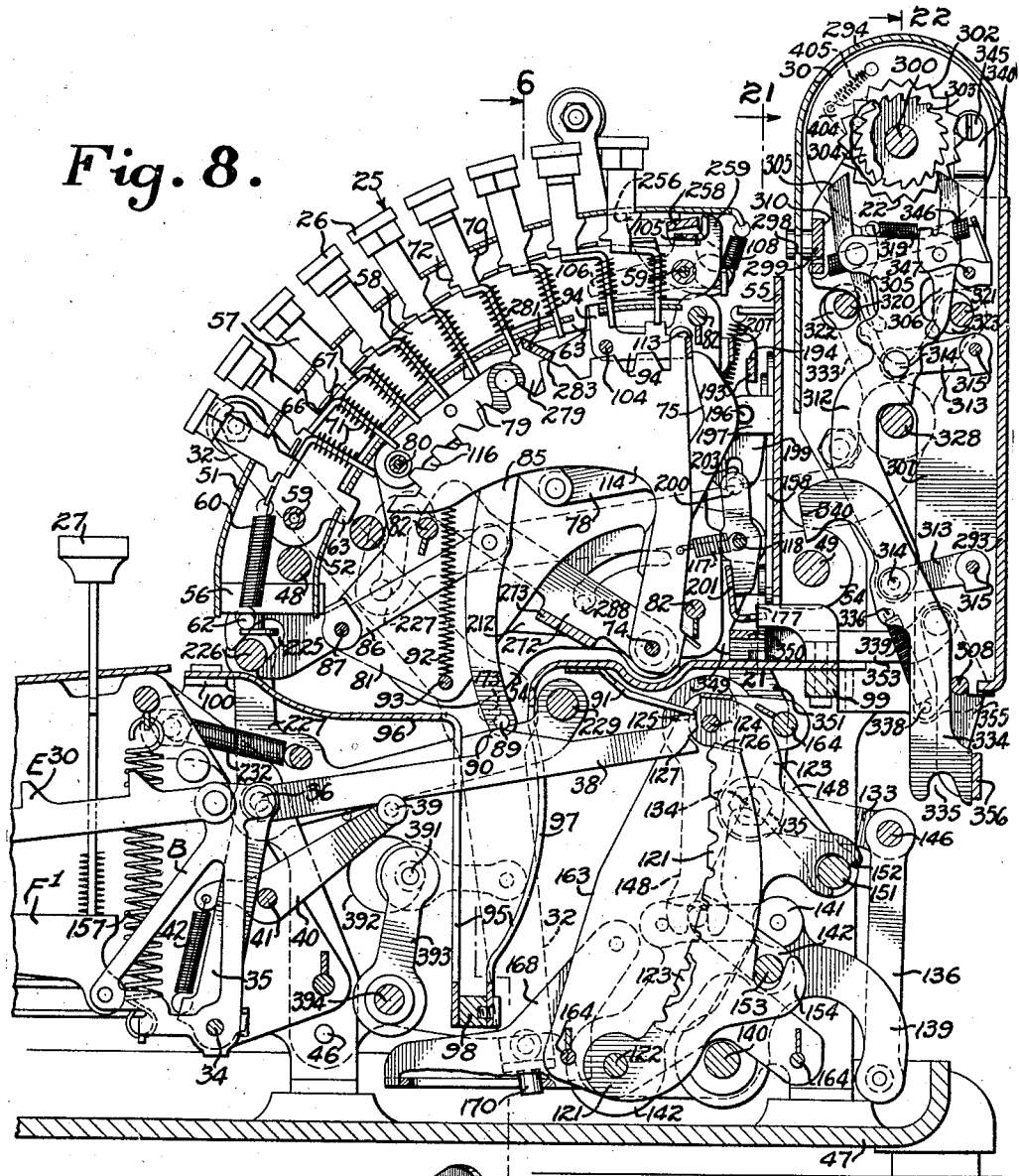
Figure 9:
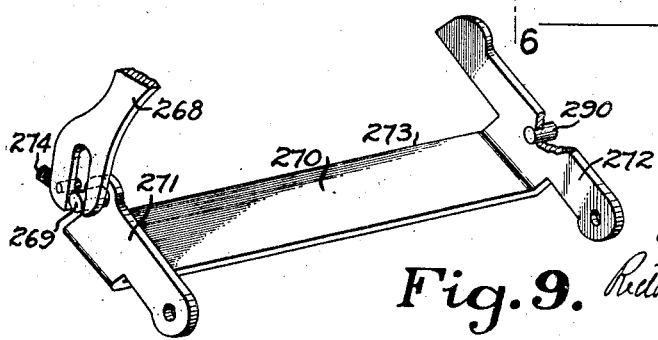

Of said drawings, Fig. 1 is a right-hand side elevation of the machine embodying our invention, with the parts shown in normal adding condition and illustrating the control hand levers and some of their associated parts in dotted lines; Fig. 2 is a fragmentary sectional view, looking at the inside of the back panel of the auxiliary keyboard section, and showing the column-locking plates in elevated position, the section being taken substantially on the line 2—2 of Fig. 17; Fig. 3 is a vertical section taken through the machine, substantially on the line 3—3 of Fig. 5 and showing the parts in normal adding condition; Fig. 4 is a detail side view, foreshortened, of the mechanism for adding the extra "1" on the units accumulator wheel in dividing operations, the mechanism being shown in its forward moved position; Fig. 5 is a sectional plan view taken substantially on the line 5—5 of Fig. 3 and showing the calculator keyboard partly in plan view and partly broken away; Fig. 6 is a vertical section taken transversely through the machine and looking toward the rear, the section being taken substantially on the line 6—6 of Fig. 8; Fig. 7 is a detailed perspective view of two of the key stems of the auxiliary keyboard of the multiplying attachment, illustrating the manner in which the upper portions of the alternate keystems of a bank are oppositely disposed; Fig. 8 is an enlarged vertical section taken through the multiplying attachment of the machine, the section being taken substantially on the line 8—8 of Fig. 5; Fig. 9 is a perspective fragmentary view, showing the restoring bail for returning to normal condition the parts of the multiplying section moved differentially under the control of the auxiliary keyboard; Fig. 10 is a skeletonized section through the multiplying attachment, the section being taken on substantially the same line as that of Fig.

Figure 13:
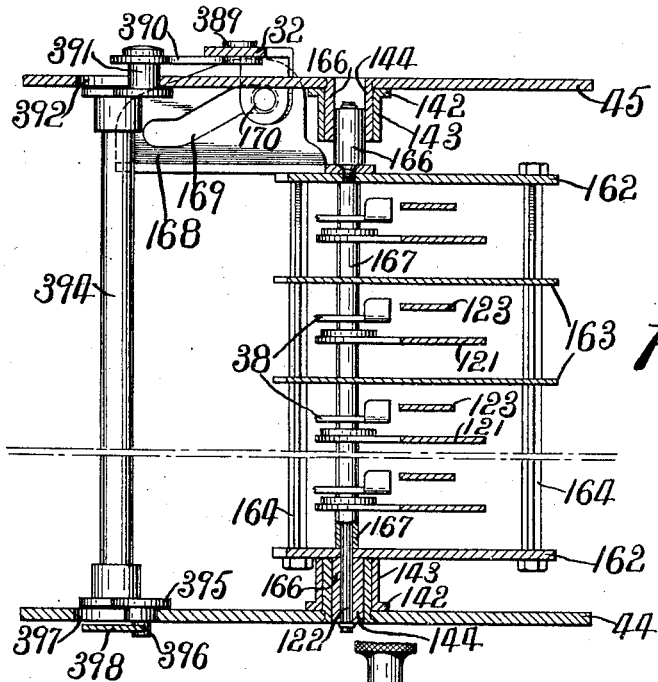
Figure 14:
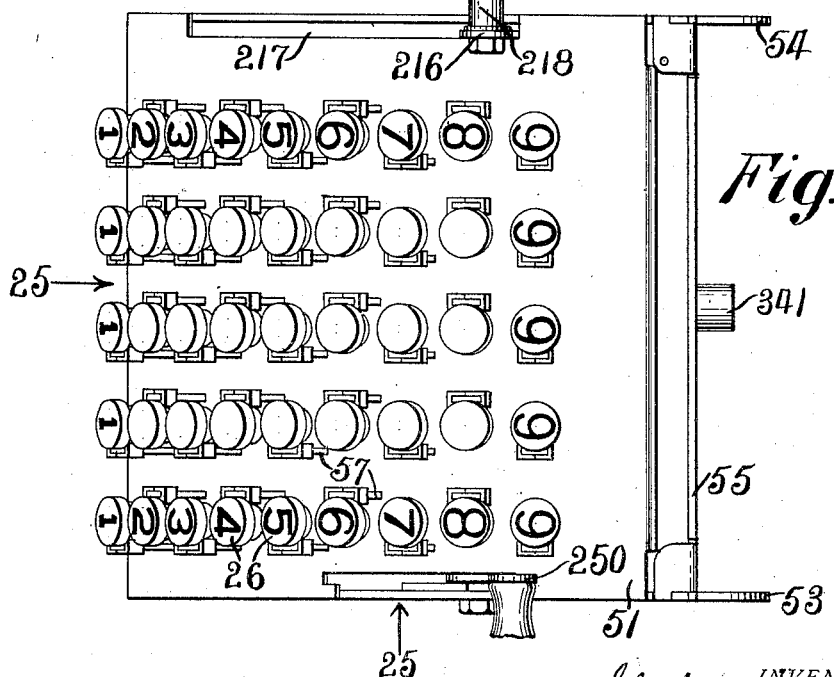
Figure 15:
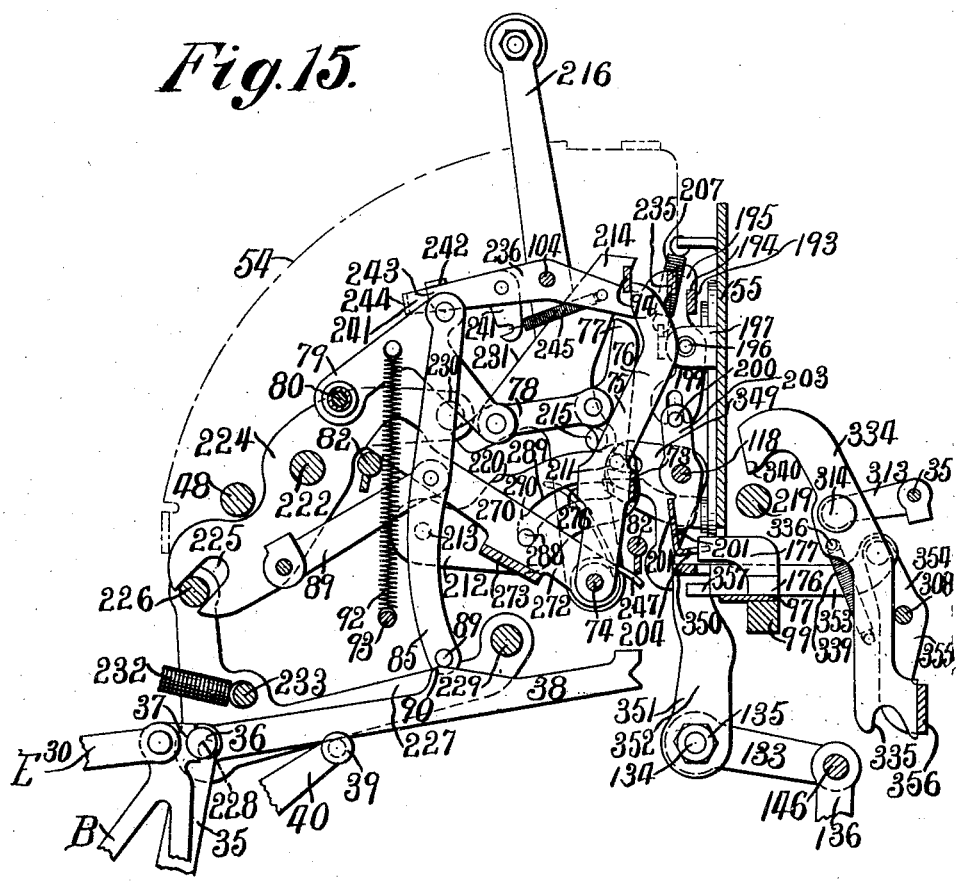
Figure 16:
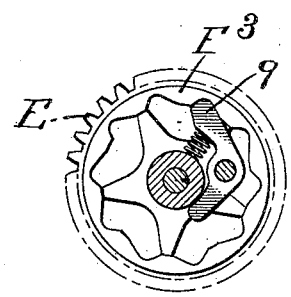
Figure 21:
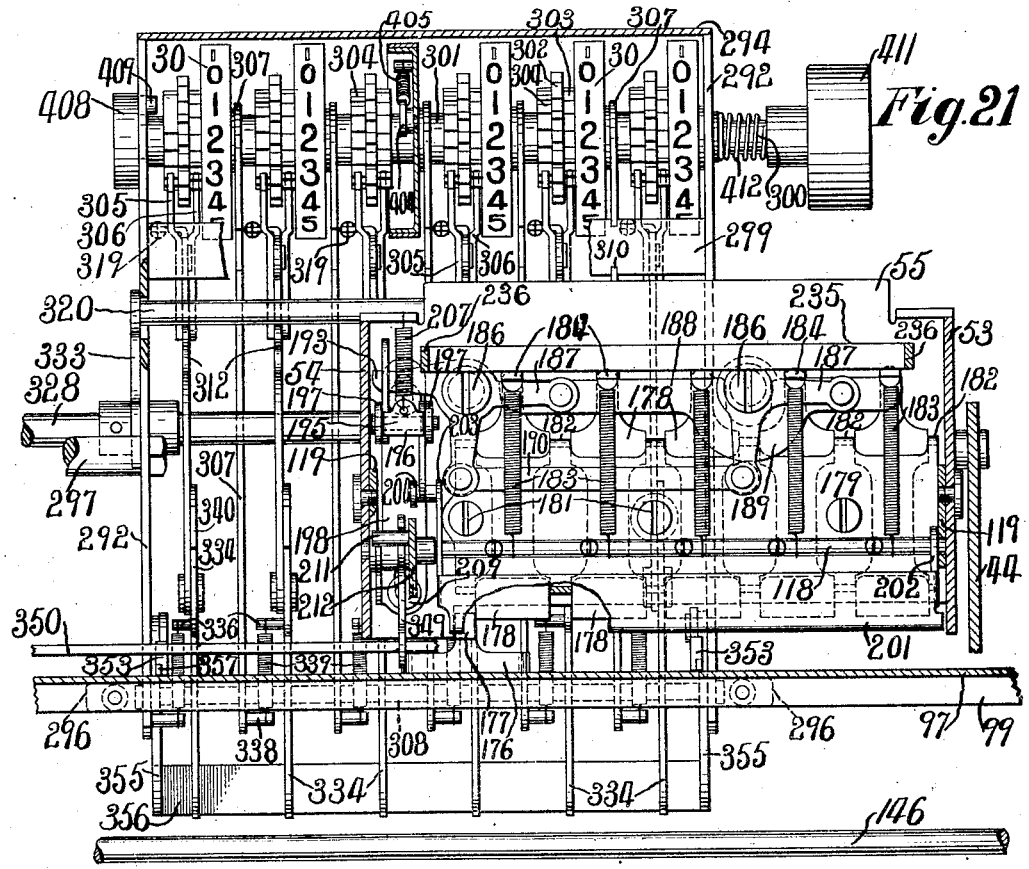
Figure 22:
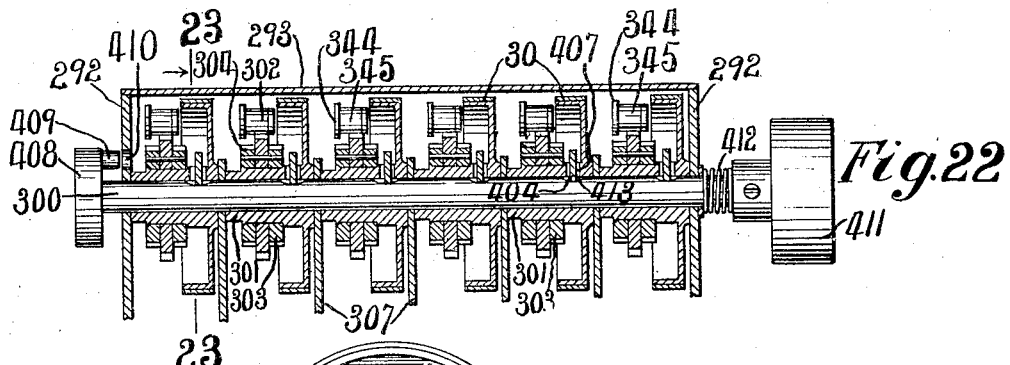
Figure 23:
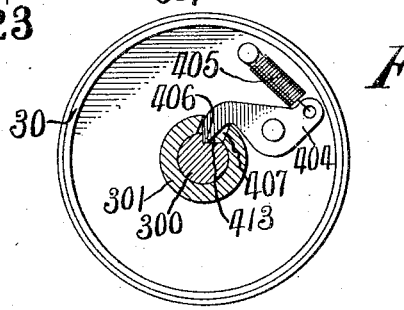

8, and the parts being shown in adding condition and in the position which they assume at the end of the forward stroke of the operating crank during a multiplying operation of the machine with the "5" key depressed; Fig. 11 is a detail perspective view of one of the locking plate units for each bank of keys on the auxiliary keyboard; Fig. 12 is a detail perspective view of the key releasing bail, the yoke shaped member on one of the key locking units and the associated locking yoke for the appropriate indexing stop member, the view illustrating the relation of these parts; Fig. 13 is a sectional plan view, foreshortened, through the complementally arranged driving arms and shifting frame, which are shown in subtracting condition; Fig. 14 is a plan view of the auxiliary keyboard; Fig. 15 is a skeletonized sectional view for the most part through the keyboard section of the multiplying attachment, the section being taken substantially on the line 15—15 of Fig. 6 with the left hand partition plate omitted, and the parts being shown in normal condition; Fig. 16 is a detail side view of the ratchet and pawl connection between one of the actuating segments and the corresponding accumulator wheel; Fig. 17 is a skeletonized sectional view through the auxiliary keyboard section and part of the counter-actuating mechanism, the section being taken just within the left hand side plate of the auxiliary keyboard and showing the keyboard shift lever in its forward locked position; Fig. 18 is a developed or flattened out view of one of the counter wheels, showing the multiplier indicating digits in black full line and the quotient indicating digits in skeleton; Fig. 19 is a fragmentary horizontal section through the back panel of the auxiliary keyboard and the locking plates, being taken substantially on the line 19—19 of Fig. 17, to show the mechanism for locking the auxiliary keyboard in its ordinal or columnar positions and releasing the keyboard shift lever; Fig. 20 is a detail view illustrating the action of the releasing rock plate on the column stop to release the keyboard shift lever and locking plates for the auxiliary keyboard; Fig. 21 is a vertical section taken on the line 21—21 of Fig. 8, to show the auxiliary keyboard column-locking mechanism and the counter mechanism, with the keyboard in its extreme right-hand position; Fig. 22 is a section taken through the counter, as on the line 22—22 of Fig. 8; Fig. 23 is an enlarged section on the line 23—23 of Fig. 22, showing one of the counting wheels and its spring-pressed turn-to-zero pawl; Fig. 24 is a detail sectional view through the accumulating section, the section being taken substantially on the same line as Fig. 3, and Fig. 25 is a section through the accumulator, taken as on the line 25—25 of Figs. 1 and 24.

Our invention contemplates the use of the multiplying and dividing mechanism or attachment in connection with a commercial form of calculating machine now on the market, the combination being effected in such a manner that the calculating machine may be used in its ordinary way and independently of the multiplying and dividing attachment, to perform the simpler operations of addition and subtraction. While we have shown our invention applied to the well-known commercial form of Burroughs calculator, it is to be understood that it is susceptible of use with other kinds of calculators and may, if desired, be incorporated in the machine itself as an integral mechanism thereof. The Burroughs calculator is a key-driven machine comprising, in general, an accumulator, consisting of a plurality of denominational numeral wheels, differential actuating devices, one for each accumulator wheel, and a multiple order keyboard including sets or banks of keys, one bank for each actuating device. This calculator, with our invention applied, may be used with accuracy, expediency and rapidity to perform operations of addition and subtraction, as is well understood in the art, and may also be used, but without the same facility or certainty, to perform computations involving multiplication and division. For the purpose of performing the more intricate computations of multiplication and division with certainty, dispatch and but little experience or training on the part of the operator, we have equipped the calculator with an attachment comprising an ordinarily shiftable auxiliary keyboard, an operating crank, and means driven by the crank for propelling the differential actuating devices for the accumulating wheels under the control of the amount-determining manipulative devices of the auxiliary keyboard which in the preferred form comprise banks of depressible keys, adapted to be set to represent one of the factors of a multiplying or dividing problem. For the sake of convenience, this mechanism will be referred to as the multiplying attachment or section, although it is understood that it is also used in performing the process of division and other computations.

In order that the detailed description of the invention, which is to follow, may be more readily understood, it may be well first to explain briefly the general processes or operations of multiplication and division, as performed by the machine embodying our invention, illustrating by simple examples, and referring, for the most part, only generally to the auxiliary keyboard, the number wheels of the accumulator, and the number wheels of the counting mechanism which are used for indicating the quotient of a dividing problem or the multiplier of a multiplying problem. Taking up the process of multiplication first, let the example be

54×32=1728.

The multiplicand "54" is to be added on the accumulator as many times as there are units in the right hand digit of the multiplier, which in the example is "2" and then is to be added on the accumulator wheels one place or order to the left as many times as there are units in the digit in the tens order on the multiplier, which in this case is "3", multiplication being repeated addition of the multiplicand on the accumulator in each place or order according to the digits and places thereof in the multiplier. As there are two denominations represented in the multiplier (32), the auxiliary keyboard, designated generally by the reference numeral 25 in Figs. 1 and 14, is shifted to its extreme right hand or units position so that its unit bank of keys 26 is in substantial alignment with the first or units bank of keys 27 of the Burroughs calculator, which in turn is in fixed alignment with the units numeral wheel A of the accumulator, positioned at the front end of the machine and comprising a plurality of accumulating numeral wheels A, displaying their digits through the usual sight-openings 28 in the accumulator casing (Fig. 5). The "5" key of the tens bank and the "4" key of the units bank of the auxiliary keyboard are now depressed to represent the multiplicand "54", and the machine given two cycles of operation through two strokes or rotations of the operating hand crank 29 (Fig. 1), two strokes being taken as "2" appears in the units order of the multiplier. The auxiliary keyboard is now shifted toward the left one place or order to its tens position, and with the "5" and "4" keys in the units and tens banks still depressed, the crank 29 is given three strokes, the digit "3" appearing in the tens order of the multiplier. It will be readily understood that during each stroke of the crank 29, with the auxiliary keyboard in its first or units position or column, "54" is added on the accumulator wheels so that at the end of the two strokes "108" is displayed by the accumulator. When the keyboard is shifted one order toward the left, the setting of differential devices under the control of the keys depressed in the units and tens banks, is trans-set or transposed from the units and tens denominations, respectively, to the tens and hundreds denominations respectively, as will be explained later. "540" is added on the accumulator during each stroke of the operating crank with the keyboard in its tens position or order, so that at the end of the entire series of strokes the correct product "1728" is displayed by the accumulator wheels A. During each stroke of the crank 29 with the keyboard in the units position, the units numeral wheel 30 of the counter, positioned to the rear of the auxiliary keyboard, is moved one step so that at the end of the second stroke, the numeral "2" on this wheel is displayed through its sight opening in the counter casing and during each stroke of the crank 29 with the keyboard in its second or tens position, the tens counter wheel 30 is moved one step to display its numeral "3" at the end of the third stroke, the number "32" then appearing on the counter and indicating the multiplier.

The process of division is carried out with our machine by repeated subtraction of the divisor from the dividend, set upon the accumulator, or in other words, by successive addition of the complement of the divisor to the dividend on the accumulator, "9" being automatically added during each stroke of the crank 29 in a dividing operation in all denominations not represented by digits in the divisor and an extra "1" being added in the units order to give the correct result. Let the division example be 1728÷54=32, and assume that the accumulator and counter have been cleared with all their numeral wheels displaying "0". The keys 27 of the calculator are operated to enter "1728" on the accumulator wheels A in the usual manner. The auxiliary keyboard is now shifted so that its units bank of keys 26 is in alignment with the second or tens accumulator wheel A, it being obvious that "54" is contained in "172" but is not contained in "17" (the two left-hand digits of the dividend), hence making it unnecessary to shift the auxiliary keyboard to its third or hundreds column or position. A lever 32 (Fig. 1) called the "subtraction" lever herein, is also operated to condition the machine for division. "54" is now set up on the auxiliary keyboard by depression of the "5" key in the tens bank and the "4" key in the units bank. The operating crank 29 is now turned three times, the operator noting at the end of each of the first two strokes that "54" is still contained in the remainder shown by the accumulator numeral wheels to the left of the units wheel, while at the end of the third stroke he will note that the remainder on these wheels is "10" which does not contain "54". During each of these strokes of the crank, "1" is added on the tens wheel 30 of the counter so that at the end of the third stroke, the counter displays the partial quotient "30". The auxiliary keyboard is now shifted one order or place toward the right, to transpose or trans-set the setting of the differential devices under the control by the depressed keys on the keyboard from the tens and hundreds denominations to the units and tens denominations, respectively. The crank is now given two strokes, which clears or sets the accumulator wheels "A to O", and adds "2" on the units wheel 30 of the counter, the counter now displaying "32" which is the correct quotient.

During each stroke of the crank 29, while the auxiliary keyboard was in its second or tens position, the tens actuating device for the accumulator and the corresponding numeral wheel A were moved five steps, "5" being the complement of "4", with respect to "9", and the hundreds actuator and accumulator wheel A were moved four steps, "4" being the complement of "5", with respect to "9". At the same time the units actuating device and numeral wheel A and each actuating device and numeral wheel A to the left of the hundreds order were moved nine steps to add "9" on each wheel and an extra "1" was automatically added to the units numeral wheel A, this "1" being for the purpose of completing the full complement of the divisor with respect to "10" as is well understood in the art. To illustrate graphically the principle of this complementary subtraction operation, during the first stroke of the crank 29 with the auxiliary keyboard in its tens position to subtract "540", in effect, from the dividend, leaving a remainder of "1188" on the accumulator numeral wheels, the following action took place, disregarding the denominations higher than the sixth order:

```
  1728  Dividend
999459  Complement of 540 with "9's"
------
001187  Remainder minus "1"
     1  Extra "1"
------
001188  Correct remainder
```

This computation is repeated upon each stroke on the crank 29 with the auxiliary keyboard in its second or tens position, and a similar action takes place when the keyboard is in its first or units position, except, of course, the complement "999945" is added to the dividend and an extra "1" is added to give the correct remainder.

*Burroughs calculator*

As stated above, we have shown our invention applied to the well-known form of Burroughs calculator which is fully illustrated in the Horton Patent No. 1,326,504, with slight modifications, as will be pointed out presently, and in order to identify the parts of the present invention we will utilize the same reference characters as employed for similar parts in the Horton patent.

Referring now to Figs. 3, 5, 24 and 25 of the present drawings, the accumulator comprises the numeral wheels A and the associated gear wheels A' which carry the planetary pinions D meshing with sun gears E and with internal gears F on the numeral wheels. The carrying mechanisms comprise cams G and sun gears P carried by the numeral wheels, intermediate internal gear wheels C on the hubs of the sun-gears E, oscillating gear carriers L whose gears N and O mesh respectively with the internal gears C and the sun gears P, and levers H having teeth on their upper ends in mesh with the teeth on the carriers L and held with their studs $H^2$ against the cams G by springs J, all as substantially shown and described in the aforesaid Horton patent and also in Gooch Patent 1,128,679. Gear wheels $E^2$ mesh with the gear wheels A' and the gear wheels $E^2$ are provided with circular flanges $E^3$ as shown in Fig. 16, provided with internal teeth and engaged by spring-pressed ratchet pawls 9, carried by pinions 8 meshing with oscillating segments E' which derive power from the keys 27 through connections comprising stop bars $E^{30}$ (Fig. 3) coupled to the segments, bell-crank levers B to which the rear ends of the stop-bars are pivoted and the key-driven levers F' connected at their forward ends by links $F^2$ to the stop-bars $E^{30}$. It will be understood that through these driving connections and the restoring springs 157 connected to the levers B, depression of the keys 27 causes oscillation of the segments E' and that through the medium of the gear wheels $E^2$, the aforesaid ratchet and pawl connections and the planetary gearing, first mentioned, the numeral wheels A are advanced in a clockwise direction, as viewed from the right-hand side of the machine. This corresponding rotation of the cams G swings the upper arms of levers H forward and when the high points of the cams pass the lever studs $H^2$, the levers H are operated to transmit carrying impulses, as fully explained in the above-mentioned Horton and Gooch patents. This, of course, involves the rotation of the intermediate gear wheels C in a counter-clockwise direction, the ratio of the gearing being such, in the organization here shown, that in transmitting the carrying impulses one of these intermediate gear wheels C makes one-fifth of a turn.

As in the Horton patent, zeroizing or clearing of the numeral wheels A is accomplished by oscillating the gear carriers L in opposition to the springs J, the intermediate gears C being locked against rotation in a clockwise direction so that the numeral wheels A will be advanced by the turning of the gears N, O and P. For the purpose of thus locking the intermediate gears C, arms 2 are rocked so that the hooks $2^a$ at their upper ends engage studs $e$ on the gear discs C. The locking levers 2 are operated through the bail 5, the cross-rod 6 of the bail projecting through slots $2^d$ in the lower ends of the levers. The bail 5 is fast on a shaft S, which is oscillated by a crank handle W (Fig. 1) through the connections, not fully illustrated in the present drawings but fully shown and described in the aforesaid Horton patent. The downward movement of the rod 6, as caused by pulling forward the crank handle W, besides operating the levers 2 also serves to drive the levers H by engaging their lower projections H³, to supplement the action of the springs J and insure a zeroizing action of said levers even though the springs should fail.

For the purpose of preventing backward rotation of the gears E², upon forward actuation by the segment E', we employ yoke-shaped back-stop pawls Z provided with noses Z' adapted to engage the undercut teeth of ratchet wheels Y fastened to the same hubs with the corresponding gear wheels E², the pawls being retained in engagement with the ratchet wheels through springs R³. This construction is slightly different than that shown in the Horton patent, in which the corresponding pawls engage laterally projecting teeth on the gear wheels E² and with which the corresponding pawls 9 coact to drive the gear wheels E², the circumferential flange E³ (Fig. 16) with the internal ratchet teeth being employed in our construction in place of the offset teeth of the Horton wheel E³. A cross-shaft 10 is provided with arms 11 having forwardly extending projections 12 which, when the shaft 10 is rocked during a zeroizing operation, engage projections Z² on the yoke-pawls Z, rocking the pawls to release them from engagement with the under-cut teeth of the corresponding ratchets Y. The arms 11 also have noses 11ª which, when the shaft is rocked, engage the upper extensions of the driving pawls 9, which extend towards the right beyond the flanges E³ to permit this engagement, thus rocking the pawls 9 to release them from engagement with the internal ratchet teeth, the ratchet and pawl connection being disabled to avoid any interference with the reverse rotation of the gear wheels E² which accompany a backward turning of the numeral wheels A during a zeroizing operation. The shaft 10 is operated through connections with the aforesaid rock-shaft S, which comprises an arm 31 having a stud 12 engaging in the cam slot in the cam plate 13, which at its upper end has one end forked to engage a stud on an arm 10ᵇ fast to the shaft 10, all as described in the Horton patent.

Notched discs 15 integral with the pinions 8 cooperate with the usual mutilated pinions 16 to prevent overthrow of the pinions and driving segments E', also as fully described in the aforesaid Gooch and Horton patents.

*Actuating members of the multiplying section associated with the actuating mechanism of the accumulator.*

On the shaft 34, (Figs. 3, 5, 8 and 10) supported in the side frames of the calculator and on which are mounted the bell-crank levers B pivoted to the rear ends of stop bars E³⁰, are upwardly extending arms 35 one adjacent each lever B, having yoke-shaped bearings on the shaft 34. The upper end of each of these arms carries a shouldered stud 36 engaging a semi-circular notch 37 formed in the upper rear edge of the adjacent lever B. Pivoted at their forward ends on the studs 36 are rearwardly extending actuating or operating members 38, which are adapted to be differentially swung downward under the control of the keys 26 of the auxiliary keyboard and to be driven forwardly to actuate the accumulator numeral wheels A extents determined by the value of the keys 26 depressed on the auxiliary keyboard, the numeral wheels A being rotated by the members 38 through the stop bars E³⁰ and the before described intermediate gear mechanism. The members 38 rest upon flanged rollers 39 mounted on levers 40 pivoted on a cross shaft 41 which is supported at its ends in the side frames of the calculator. The forward ends of the levers 40 are connected to the upper ends of springs 42, connected at their lower ends to offset lips on the arms 35, the springs 42 through the levers 40 and rollers 39 serving to retain the members 38 in their normal uppermost position, shown in Fig. 3 and also serving to normally retain the arms 35 in their rearward positions with their rear edges engaging the shaft 41. From this description it will be obvious that the calculator may be used independently of the multiplying section or attachment without effecting operation of any part of the mechanism of the multiplying section, the levers B being permitted to rock forwardly independently of the arms 35 upon depression of the calculator keys 27, as the upper ends of the levers B merely move away from the shouldered studs 36. This is highly desirable as the calculator may be used in its ordinary intended manner and independently of the multiplying section, to perform operations of addition and subtraction and other simple computations.

*Frame of multiplying section*

A pair of side frames 44 and 45 (Figs. 1 and 5) are fastened by bolts 46 to the rear upper and lower corners of the side frames of the calculator. The shiftable auxiliary keyboard 25 is slidably mounted on cross-rods 48 and 49 (Figs. 3 and 8) which are connected at their ends to the side frames 44 and 45 by means of screws 48' and 49', as shown in Fig. 1. The side frames 44 and 45 are also connected together by other cross-bars and shafts, as will be described later. A common base 47 is provided for both the calculator and the multiplying section, the side frames of both being provided with feet resting on the base.

*Auxiliary keyboard*

The keyboard section, which is slidably mounted on the cross-rods 48 and 49, comprises a pair of concentric keyboard plates 51 and 52 (Figs. 3, 6, 8 and 10) the upper plate 51 being rigidly connected at its four corners by screws or otherwise, to side plates 53 and 54, which are provided with holes through which the cross-rods 48 and 49 project to permit the keyboard to be slid transversely from order to order, or place to place. The rear edges of the end plates 53 and 54 are connected by a back panel 55. The inner keyboard plate 52, which is concentric with the outer plate 51 is separated from and supported by the latter through spacing collars 56, there being four of these spacing collars, one at each corner of the plate 52. These concentric keyboard plates 51 and 52 are slotted to guide the key-stems 57 of the depressible keys 26, which, as explained above, are employed in multiplying and dividing operations to represent the multiplicand or divisor. The slots in the outer plate 51 are arranged in staggered formation, or, in other words, alternately offset while the slots in the lower plate 52 are in alignment with each other, the key-stems 57 being formed so that their upper portions are alternately offset with respect to each other while their lower portions are all in alignment, as best shown in Figs. 6 and 7.

*Key-locking mechanism*

Mounted between the concentric keyboard plates 51 and 52 are a series of curved key-locking plates 58, (best shown in Figs. 10 and 11) the plates being arranged in pairs with one pair for each bank of keys. The respective plates of each pair are fastened together by spacing sleeves 59, one at each end, to form a unit. Each unit is normally held in its forward position, shown in Fig. 8, by its appropriate pair of springs 60 connected at one end to the forward ends of the plates, and at their lower ends to a cross-rod 62 welded or otherwise connected to the forward spacing sleeves 56. The lower edges of the plates 58 are provided with hooked projections 63 which extend through slots 64 in the inner keyboard plate 52, the projections and slots serving to guide the locking plates and the projections engaging the inner side of the plate 52 to prevent vertical displacement of the locking plates relative thereto. The forward ends of the slots 64 also function to limit the forward movement of the locking plates under the action of their springs 60 as they normally engage the ends of the notches giving the projections 63 their hook formation. To prevent depression of a second key in a bank after one key in the bank has been depressed and to lock the depressed key in its lower position, the key-locking plates 58 have bent ears or projections 65 extending laterally toward each other. The ears 65 are beveled at their forward edges 66, but not at their rear faces or edges 67. As shown in Figs. 7, 8 and 10 the key-stems 57 are provided with rear projections 70 beveled on their under sides so that when a key is depressed the beveled side of its projection 70 engages the forward beveled edge 66 of the corresponding lug 65 on the locking-plate 58 and forces the pair of plates 58 for that particular bank rearwardly, and as the projection 70 passes beneath the lug 65, the springs 60 slide the pair of plates slightly forward until the front face of the lug 65 overlies the square shoulder of the beveled extension 70, thereby locking the key in depressed position against the action of its spring 71, coiled about the lower part of its key-stem. As the key-stem above the projection 70 is of greater width than below the projection, the locking plates, when in locking relation with a depressed key, as shown in Fig. 10, have not been drawn forwardly their full extent and consequently it will be impossible to depress a second key in the same bank, while one is already in depressed position, because the rear ends 67 of the upper sides of the lugs 65 will be positioned rearwardly of their normal position an extent sufficient to bring them beneath the square under sides of projections 72 formed on the forward edges of the upper portions of the key-stems, thus blocking the keys against depression.

The depressed keys of the auxiliary keyboard are retained in their depressed condition by means of the locking units, comprising the plates 58, as above described, during the entire series of cycles of operation necessary to perform a multiplying or dividing calculation and, after a computation has been completed, the depressed keys may be released by the manipulation of a hand lever to be described later.

*Mechanism for setting differential members 38 under the control of the auxiliary keyboard*

Depression of keys 26 of the auxiliary keyboard first releases differential devices which are then moved by spring action until they are arrested by the depressed keys, actuating members 38 in operative alignment being set through these differential devices which will now be described. Pivotedly mounted on a cross-rod 74 (Figs. 6, 8, 10 and 15) are five indexing stop members 75, there being one for each blank of keys 26. Each member comprises a pair of arms 76 and 77 connected by a bridge 73. The upper end of each arm 77 is connected by a link 78 to a corresponding T-shaped lever 79, loosely mounted on a cross-rod 80 supported in partition plates 81 (best shown in Figs. 6 and 17) which are positioned between the differential units of the auxiliary keyboard and are supported on and spaced by three cross-rods 82 mounted at their ends in the side plates 53 and 54 of the auxiliary keyboard section. Pivotally mounted on each lever 79 (Figs. 6, 8 and 10) is an operating or setting link 85, which is also pivoted intermediate its length to the rear end of an arm 86 loosely mounted at its forward end on a cross-rod 87 also carried by the partition plates 81. The lower end of the arm or link 85 is provided with a stud 89 normally projecting over an inclined hump or projection 90 on the upper edge of the corresponding actuating member 38. Springs 92 are connected at their upper ends to the T-shaped levers 79 and at their lower ends to studs 93 projecting from the partition plates 81. When the machine is in normal condition, all of the indexing stop members 75 are retained in their rearmost positions, shown in Fig. 8, by corresponding yoke shaped retaining members 94, the bridges of which are normally engaged by the upper forward edges of the arms 76. When a key in a bank is depressed, the bridge of the corresponding retaining member 94 is raised out of engagement with the arm 76, as will be presently described, whereupon the spring 92 is permitted to lower the T-shaped member 79 and rock the indexing stop member 75 counterclockwise, as viewed in Figs. 8 and 10, through the link 78, until the forward upper edge of the arm 76 abuts the inner end of the key-stem of the depressed key, whereupon further movement of the indexing stop member is arrested. During this movment of the lever 79, the link 85, supported thereby, is lowered, whereupon its stud 89, through its engagement with the projection 90 on the corresponding actuating member 38, rocks the latter downwardly (clockwise) about its stud 36 and against the action of the spring 42 which is weaker than the spring 92 and is connected to the lever 40 which is also rocked clockwise as the actuating arm 38 rests on its roller 39. The members 38 are guided in their movements by aligned vertical slots 95 in the vertical portions of plates 96 and 97, having horizontal portions extending laterally under the keyboard section, the rear plate 97 being mounted at its opposite ends on square cross-bars 98 and 99, respectively, secured at their ends to the end-frames 44 and 45, and the front plate 96 being secured at its lower edge to the square cross-bar 98 and at its forward end to lugs 100 on the forward upper corners of the end frames 44 and 45. The space between the two vertical portions of the plates 96 and 97 accommodates the movement of the lower ends of the setting links 85 and their studs 89. Laterally extending ears 125 on the rear ends of the members 38 engage, when the members 38 are in normal positions a sheet metal comb 91 secured to the plate 97. It will be observed that the keys 26 of each bank are numbered "1" to "9" from front to back, the "1" keys being in the front transverse row and the "9" keys on the rear row, so that when a key in one bank is depressed, when the machine is set for subtraction (division) the stop member 75 and actuating member 38 for that bank are rocked extends complemental to (with respect to 9) the value of the key depressed. For example when the "2" key of a bank is depressed, the stop member controlled thereby is rocked forwardly and the corresponding actuating member 38 rocked downwardly seven units or steps. When set for addition (multiplication) the stop members and actuating members are rocked extents directly proportional to the key depressed as in Fig. 10.

*Means for releasing indexing stop members 75*

The yoke-shaped restraining members 94 (Figs. 8, 10 and 12), there being one for each bank of keys, are mounted beneath the upper end of the lower keyboard plate 52, on a cross-rod 104 supported in the partition plates 81. Mounted on a short shaft extending through and slightly beyond at each end of the rear sleeve 59, connecting the pair of locking plates 58 of each unit, is a second yoke-shaped member 105, the forwardly extending arm 106 of which normally rests on top of the vertical projection 107 on the left-hand side of the corresponding restraining member 94 as shown in Figs. 8 and 12. A spring 108, connected at its upper end to a lip on the outer keyboard plate 51 and at its lower end to a lateral projection 109 on the rear end of the left hand side of the yoke-shaped member 105, normally tends to rock this member counterclockwise, but this movement is restrained by the engagement of the upper end of the projection 107 with the underside of the arm 106. The projection 107 extends through one of the rear slots 64 which is widened to accommodate the projection and the rear hook 63 on one of the key-locking plates 58. A laterally extending lug 110 (Fig. 12) on one side on the restraining member 94 projects over the adjacent partition plate 81 and normally rests thereon, the member 94 being retained normally in such condition by a spring 112, connected at its upper end to the member 94 and at its lower end to a suitable stud on the adjacent partition plate 81. Normally the yoke-shaped restraining member 94 is locked against counterclockwise movement by an offset lip 113 on a locking segment 114, the lip normally projecting over the bridge of the member 94, as best shown in Fig. 8. There is one of these locking segments 114 for each bank of keys and they are loosely mounted at their lower ends on the cross rod 74. Each of the segments is provided on its periphery with nine notches 116, the forward face or edge of each notch being inclined downwardly and inwardly to form a cam surface against which the inner end of the corresponding key-stem 57 acts when a key of the corresponding bank is depressed, with the result of slightly rocking the segment forwardly to move the lip 113 from locking engagement over the bridge of the corresponding restraining member 94, the segment being rocked against the action of its spring 117, connected at its forward end to the segment and at its rearward end to a rock-shaft 118, which is supported in forwardly projecting lugs 119 (Fig. 21) on the back panel 55. It will be observed that when a key 26 is depressed, it descends slightly further than shown in Fig. 10, its full extent of depression being sufficient to carry its lower end almost to the bottom of the notch 116, so that the key-stem in acting upon the cam edge of the notch will rock the locking segment forwardly an amount sufficient to release the yoke-shaped restraining member 94 and the subsequent rebound action of the keystem under the impulse of its spring 71 slightly elevates the key-stem to its position shown in Fig. 10, the bridge of the member 94 having been moved in the meantime to the rear of the lip 113, as will now be explained. Upon depression of a key, the key-locking plates 58 for that bank are moved rearwardly under the action of the beveled projection 70 on the key-stem and, as the yoke-shaped member 105 is carried on the shaft supported on the locking plates, it is moved rearwardly until the lower edge of its arm 106 slides off of the upper end of the projection 107 on the yoke-shaped restraining member 94, whereupon the spring 108 rocks the member 105 in a counterclockwise direction to move the forward end of its arm 106 behind the projection 107. Now upon partial return forward movement of the locking plates 58 to the position shown in Fig. 10, when the projection 70 on the key stem moves out of engagement with the locking lug 66 on one of the locking plates 58, the member 94 is rocked counterclockwise to elevate its bridge out of engagement with the upper end of the arm 76 of the indexing stop member 75, whereupon the latter is moved differentially as above described, being arrested in its movement by engagement with the inner end of the key stem of the key which has been depressed.

After the keys of the auxiliary keyboard have been depressed to represent either the multiplicand or the divisor, as the case may be, they remain in their depressed positions and also the indexing stop members 75, and hence the setting links 85 remain in their differentially set positions during the entire computation.

Mechanism is provided for releasing the depressed keys of the auxiliary keyboard at the end of a computation and for also at such time restoring the indexing stop members 75 and associated parts to normal position, but this mechanism will not be described until after the mechanisms for driving the differentially set actuating members 38, and hence the accumulator segments E′ through the stop bars E³⁰, in multiplying and dividing operations have been described.

Multiplying and dividing driving mechanism

This mechanism, as best shown in Figs. 6, 8 and 10, comprises pairs of parallel and complementally arranged arms, one pair for each denomination represented in the calculator and each pair consisting of a driving adding (multiplying) arm 121, pivotally mounted at its lower on a cross-rod 122 and a subtracting (dividing) driving arm 123 pivotally mounted at its upper end on a cross-rod 124. The supporting rods 122 and 124 are mounted in a carriage or frame, which may be shifted from adding to subtracting position or vice versa, dependent upon whether the machine is to perform a problem in multiplication or division, for the purpose of positioning the adding arms 121 in operative alignment with the laterally extending ears 125 on the rear ends of corresponding actuating members 38 during multiplying operations and to position the subtracting arms 123 in alignment with said ears 125 for the purpose of carrying out dividing computations. The carriage and mechanism for shifting the adding and subtracting arms 121 and 123 will be described later. Upon each stroke of the operating crank 29, above referred to, the adding and subtracting arms 121 and 123 are rocked forwardly, but in opposite angular directions about their respective pivot rods 124 and 122, from their normal positions shown in Fig. 8 to their limit of forward movement determined by the key depressed shown in Fig. 10, the arms being rocked in this manner to variable extents upon each stroke of the crank through connections to be presently described. As best shown in Fig. 10, the adding and subtracting arms 121 and 123 are provided on their forward edges with indexing notches so that when the actuator members 38 are differentially set under the control of the depressed keys 26, as above explained, their ears 125 will be in position to be engaged by those notches on the adding arms representing the value of the key depressed, if the adding arms 121 are in operative alignment, or by those notches of the subtracting arms representing the complement of the value of the keys depressed, with respect to 9 if the subtracting arms 123 are in operative alignment with the ears 125, the notches of each pair of adding and subtracting arms being complementally arranged with respect to each other, this being effected by pivoting the arms at their opposite ends. This complemental arrangement will be best understood by referring to Fig. 10 in which, for illustration, are applied the digits to the notches, the digits of the respective notches being representative of the number of steps of movement which the actuating members are reciprocated when their ears 125 are engaged by the respective notches during the forward oscillation of the adding and subtracting arms. The notches in the adding and subtracting arms are in complemental relation to each other with respect to 9. For example, assuming that the machine is conditioned for performing multiplication, if the "2" key in a bank is depressed, the actuating member 38 of that denomination is swung downwardly eight steps, to its "2" position, the keys of the bank running from "1" to "9" from front to back, which brings its ear 125 opposite the "2" notch in the corresponding adding arm, so that when the arms are swung forwardly in a multiplying operation, this "2" notch engages the ear 125 and hence moves the actuating member 38, and the associated stop bar $E^{30}$ and the actuating segment E' forwardly two steps, to add "2" on the corresponding accumulator wheel A. If the machine has been conditioned for performing division in which case the subtracting arms 123 are in alignment with the ears 125, and the "2" key in a bank is depressed, as before, the ear 125 on the actuating member 38 is then engaged by "7" notch of the appropriate subtracting arm when the latter is rocked forwardly, so that the actuating member 38 is moved forwardly seven steps, thereby rotating the corresponding accumulator wheel A seven steps in an additive direction to add the complement of "2" thereon. If the "5" key has been depressed with the machine in multiplying condition, the "5" notch of the adding arm 121 engages the ear 125 on the actuating member 38 to move the latter forwardly five steps, as shown in Fig. 10 and add "5" on the accumulator wheel A of that denomination. With the machine in dividing condition and the "5" key depressed the "4" notch of the subtracting arm will engage the ear 125 and move the actuating member 38 forwardly four steps to add "4"—the complement of "5"—on the accumulator wheel.

As seen in Fig. 10, each adding arm 121 has nine notches, one for each digit from "1" to "9" inclusive, while the subtracting arm has but eight notches for the digits from "1" to "8" inclusive. As above stated, division (subtraction) is accomplished by repeatedly adding the complement of the divisor to the dividend on the accumulator and "9" on each of the numeral wheels A of the accumulator, both to the right and the left of the numeral wheels actuated under the control of the keys 26, depressed to represent the divisor, as well as on each of the numeral wheels for the denominations in which "0's" appear in the divisor set up on the auxiliary keyboard, the extra "1" being added on the units numeral wheel A to produce the correct result. It is therefore necessary to provide means for reciprocating the actuating members 38, which have not been set, that is, moved out of normal position, nine steps during each cycle of operation in performing division. To this end the upper extremities of the adding arms are provided with offset lips 126 which, when the subtracting arms are in operative alignment with the actuating members 38 during a dividing operation, project across or behind the rear ends of the unset actuating members 38 so that upon forward oscillation of the adding and subtracting arms 121 and 123 the lips 126 will engage in notches 127, formed in the rear ends of these unset actuating members 38, to move the same forwardly nine steps and hence, through the differential mechanism of the calculator, move the corresponding numeral wheels A nine steps in an additive direction to add "9" thereon. During a multiplying operation, with the subtracting arms 123 out of operative alignment and the adding arms 121 in operative alignment with respect to the offset lips 125 on the actuating members 38, the upper ends of the adding arms 121 and their offset lips 126 are out of alignment with the notches 127 of the unset actuating members 38, so that the upper ends of the arms 121 rock past the rear ends of the members 38 and under their lips 125, without disturbing them. The mechanism for adding "1" on the units numeral wheel of the accumulator during each cycle of operation, when performing division, will be described later.

The driving connections between the operating crank 29 and the adding and subtracting arms for oscillating these arms, will now be described. The crank 29 is fastened on the hub of a cam plate 129 (Figs. 1, 5 and 6), the cam and crank arms being free to turn on a spacing stud 130 fastened to the side frame 44 and held from displacement on the stud by a screw 131 which, as shown in Fig. 5, is threaded into the contracted extension of the stud. A three-armed lever 132 (Figs. 1, 5 and 6) and an arm 133 (Figs. 5, 6 and 8) are supported on opposite sides of the machine by shouldered screws 134 extending through the hubs of the arms and fastened to the side plates 44 and 45 by shouldered nuts 135 as best shown in Fig. 5. Links 136, one on each side of the machine, are supported on the rear ends of the arm 133 and the rearwardly extending arm of the lever 132 by shouldered screws 137, which extend through openings in the rear ends of these arms and are threaded into flanged collars 138, the extreme ends of the screws being unthreaded and extending into the recesses in the end of a cross-rod 146 whose function is to operate the counter mechanism, including the number wheels 30, as will be described later. The lower ends of the links 136 are pivotally connected to crank arms 139 fastened on a cross rock shaft 140, which is journaled at its ends in the side frames 44 and 45 of the multiplying section. To the upper ends of the crank arms 139, as best shown in Figs. 3, 8 and 10, are pivoted the rear ends of connecting links 141, the forward ends of which are pivoted to T-shaped crank arms 142. The crank arms 142 are bent (Fig. 6) so that their upper ends are offset and spaced from the side frames 44 and 45 and their lower ends are provided with integral hubs 143 supported on bushings 144 (Figs. 6 and 13) fastened in openings in the side frames 44 and 45. The levers 142 have inwardly projecting studs 147 (Figs. 3 and 8), engaging in the recesses formed in the lower ends of the downwardly extending arms of bell-crank levers 148 which at their upper ends have integral hubs 149 loosely mounted on bushings 150, which are the same as the bushings 144. The rearwardly and downwardly extending arms of the bell crank levers 148 support a cross-rod 151, which engages in the recesses in rearward extensions 152 of the subtraction arms 123. A similar cross-rod 153 is supported by the rear extensions of the T-shaped levers 142 and engages in recesses in the rearward extensions 154 of the adding arms 121. The spring 155 (Fig. 1) is connected at one end to the rearwardly extending arm of the lever 132 and at its opposite end to a stud on the frame 44 and normally serves to retain the lever 132 in the position shown in Fig. 1 with a roller 156 on its forwardly and upwardly projecting arm in engagement with the periphery of the cam 129. From this description it will be seen that when the handle or crank 29 is given one rotation, it first rocks the lever 132, shaft 140 and arm 133 counter-clockwise, as viewed in Fig. 1, and through the above-described levers 139, links 141, levers 142 and 148 and the cross-rods 151 and 153, rocks the adding and subtracting arms from the position shown in Fig. 8 to that shown in Fig. 10, for the purpose of actuating the differential mechanism and the corresponding accumulator numeral wheels A extents proportional to or complemental to the value of the depressed keys 26, dependent upon whether the machine is conditioned for multiplication or division, and that during the last half of the rotation of the crank and its cam 129 the spring 155 restores the driving connections and the adding and subtracting driving arms 121 and 123 to normal position. When the differentially set actuating members 38 are reciprocated forwardly, their projections 90 are moved out of engagement with the setting studs 89, as illustrated in Fig. 10, the engagement of the ears 125 on the members 38 with the indexing notches of the adding or subtracting arms then serving to maintain the differentially set positions of the members during their reciprocation. It will also be evident that upon return movement of the adding and subtracting arms 121 and 123 to their normal position, the springs 157 (Fig. 8) connected to the levers B, restore the differential mechanism of the calculator to its normal position, the same as when the calculator is operated by the calculator keys 27, and that, as the studs 36 engage the circular notches 37 in the levers B, the springs 157 assist the springs 42 in moving the actuating members 38 rearwardly to the positions to which they were set under the control of the auxiliary keys 26, the projections 90 on the members 38 being again moved into engagement with the differentially set studs 89, so that upon each stroke of the crank 29, the amount represented by the depressed keys is added to or subtracted from the accumulator, dependent upon whether the machine is set for multiplication or division.

*Conditioning machine for multiplication or division*

As before mentioned, the machine is conditioned for multiplication by shifting the adding arms 121 into operative alignment or relation with the appropriate actuating arms 38 and is conditioned for division by shifting the subtracting arms 123 into such operative relation or alignment. For this purpose the cross-rods 122 and 124, carrying the adding and subtracting arms 121 and 123, respectively, are mounted in a shiftable frame, (Figs. 3, 5, 6, 8, and 13) comprising end plates 162 and partition plates 163, between the pairs of adding and subtracting arms, the plates 162 and 163 being bound together by three cross-rods 164 and spaced apart by spacing bars thereon. The cross-rods 122 and 124, extend at each end beyond the end plates 162 and have sleeves 166 (Figs. 6 and 13) secured on their ends and against displacement thereon, the sleeves being slidably mounted in the bearings 144 and 150 in the side frames 44 and 45 and supporting the hubs of the T-shaped levers 142 and bell crank levers 148, respectively. As shown in Fig. 13, the adding and subtracting arms are retained in spaced relation by spacing sleeves 167 on the rods 122 and 124. Secured to the outer side of the left-hand side-plate 162 of the shifting frame is an L-shaped member or plate 168, the horizontal portion of which is provided with a cam slot 169, which is engaged by a roller 170 on the lower offset portion of a lever 32, which conditions the machine for dividing and multiplication, and which is called herein the "subtraction" lever, division being repeated subtraction. As best shown in Fig. 6, the subtraction lever 32 is secured by a screw 173 on a spacing bushing 172 fast in the side-frame 45. It will be seen that when the subtraction lever 32 is moved from its forward to its rear or "adding" position, shown in Fig. 1, the roller stud 170 moves to the forward end of the cam slot 169, thereby drawing the shifting frame to the left, as viewed from the front of the machine, to the position shown in Fig. 6, so that the offset ears 125 of the actuating members 38, which have been differentially positioned, will be engaged by the adding arms 121 upon each stroke of the operating crank 29. When the upper end of the subtraction lever 32 is moved forwardly to its subtracting position, shown in Fig. 8, the roller stud 170 moves to the rear end of the slot 169, thereby shifting the shifting frame with its contained mechanism to the right, in which position it is shown in Fig. 13, so that the offset ears 125 of the said actuating members 38 are now in operative alignment with the subtracting arms 123.

*Ordinal or columnal shifting of auxiliary keyboard*

As aforesaid, in performing multiplication, the multiplicand is added on the right hand accumulator wheels as many times as there are units in the right-hand digit of the multiplier, the crank being given as many strokes as there are units represented in this digit; then the multiplicand is added on the numeral wheels of next higher denominations a number of times corresponding to the value of the digit in the next or tens order in the multiplier, and so on, the multiplicand, as set up on the auxiliary keyboard, being trans-set or trans-posed, so to speak, from order to order toward the left, according to the number of digits represented in the multiplier, the multiplicand being added in each ordinal position or place, as many times as there are units in the particular digit in that order of the multiplier. In a dividing computation, the auxiliary keyboard is shifted from order to order toward the right, the divisor, as represented by the depressed keys 26, being repeatedly subtracted from the dividend (previously set up on the accumulator wheels) in each ordinal position of the keyboard and as many times as the divisor is contained into the portion of the dividend (or remainder) represented on the numeral wheels A in alignment with the banks in which keys 26 have been set to represent the divisor and on the wheels to the left thereof, the quotient being indicated on the counter-wheels 30, as will be described later, the remainder, if any, will be indicated on the accumulator wheels. In the machine embodying our invention, the auxiliary keyboard is shifted manually from order to order, one order at a time, and is automatically locked in each order or position to which it has been shifted, a keyboard shift or releasing lever being operable to disable the locking means to permit shifting of the keyboard. As stated before, the keyboard is slidably mounted on the cross-rods 48 and 49.

*Columnar locking means for auxiliary keyboard*

For the purpose of locking the auxiliary keyboard in any one of its columnar positions, a block 176 (Figs. 2, 17, 18, 19 and 21) is fastened on top of the guide plate 97 and to the cross-bar 99 and has a forwardly projecting nose 177 which extends beneath and forwardly of the back panel 55 into the path of vertically slidable locking plates 178 whose lower edges, when the plates are in locking condition, as shown in Fig. 21, extend below the top face of the nose 177. These locking plates 178 are held in position on the back panel 55 by a cover plate 179 spaced from the back panel by spacing collars 180 (Fig. 19), through which extend headed screws 181 threaded into the back panel. At the top and bottom edges of the cover plate 179 are rearwardly bent and spaced ears 182 which project between the locking plates 178 and act as guiding and spacing means therefor. The plates 178 are shown in their elevated unlocking position in Fig. 2, but normally they are held in their lowered locking position, shown in Figs. 3 and 21, by means of springs 183 connected at their lower ends to the shaft 118 and at their upper ends to forwardly extending lips 184 formed on the upper ends of the locking plates. When the locking plates are in their normal lowered positions, two of the plates, dependent upon the selected position of the keyboard, engage the opposite sides of the nose 177 to lock the keyboard in such position of columnar adjustment. When the keyboard is in its extreme right hand or units position, the left hand plate 178 only engages the nose 177, no plate for engaging the left side of the nose then being required as the frame 44 prevents the keyboard from being moved further towards the right. Mounted on spacing collars 185, secured to the back panel 55 by screws 186, are two bell-crank-shaped levers 187 having their arms, which extend toward the right, pivotally connected to a link 188 which is bent or bowed at 189 to clear the right-hand spacing collar for the purpose of permitting the link to be raised and lowered. The downwardly extending arms of these bell crank levers are likewise connected together by a link 190. The offset lips 184 on the upper ends of the locking plates 178 rest upon the upper edge of the link 188, the locking plates being supported in this manner, and when the locking plates are in their lower locking position, shown in Fig. 21, the lower edge of the bowed portion 189 of the link 188 rests on the upper edge of the end of the link 190, thereby limiting the downward movement of the locking plates and link 188. The left-hand lever 187 has an arm 193 which projects toward the left and underlies a shoulder or nose 194 (Figs. 8, 15 and 17) on the upwardly extending arm of a yoke-shaped latch 195 pivoted on a short shaft 196 (Fig. 2, 15, 17 and 21) having bearings in forwardly struck up lugs 197 on the opposite edges of a vertically sliding plate 198. A downwardly extending arm 199 of the latch 195 is forked to engage a flanged stud 200 on the upper end of an arm 203 projecting from the left hand side of a rock plate 201 pivoted on the shaft 118, the rock plate being in the form of a bail, the right-hand end of the plate being pivoted on the shaft 118, by an arm 202. The rock plate, between its supporting arms, is L-shaped in cross section with the horizontal portion projecting rearwardly, as best shown in Figs. 8, 15, 19 and 20, and with the rear edge of its horizontal portion provided with a scalloped formation comprising a series of curved cam-humps or projections 204. A spring 207, connected at its upper end to an offset lip on the back panel 55 and at its lower end to the bridge of the yoke-shaped latch 195, normally retains the nose or shoulder 194 of the latch in engaging position over the arm 193 of the left-hand bell crank lever 187. The slide plate 198 is mounted for vertical sliding movement on the back panel 55 by the screw and slot connections 209, best shown in Figs. 2 and 21. Projecting from the lower left-hand side of the slide plate 198 is a forwardly extending finger 210 which, as best seen in Fig. 17, projects under a stud 211 extending laterally from a cam plate 212 which is pivotally mounted at 213 to the left-hand partition plate 81. Mounted on the shaft 74 is an arm 214 Fig. 15 having a projecting stud 215 overlying the top edge of the cam plate 212. The arm 214 is fastened to the keyboard shift lever 216, which is likewise mounted on the shaft 74 and which projects through a slot 217 (Fig. 14) in the keyboard plate to permit operation of the lever by a handle 218 thereon.

When it is desired to shift the keyboard from one columnar position to another, the shift lever 216 is drawn forwardly from the position shown in Figs. 8 and 15 to the position shown in Fig. 17. During the greater extent of this movement the stud 215 on the lever 214, which moves as a unit with the shift lever 216, does not rock the cam plate 212 downwardly, the upper edge of the cam plate, traveled by the stud 215, being for the most part concentric with the shaft 74, but near the end of the forward movement of the shift lever 216, the stud 215 rides upon the cam surface or projection 220, formed on the upper edge of the cam plate 212, thereby depressing the plate to the position shown in Fig. 17. During this movement of the cam plate, its stud 211 engages the finger 210 on the slide plate 198, thereby lowering the plate 198 and with it the latch 195 which is in latching engagement with the arm 193 on the left-hand bell crank lever 187. This results in rocking this lever and also its companion lever 187 through the links 188 and 190, the former being thereby raised to the position shown in Fig. 2. As the lips 184 on the locking plates 178 rest upon the link 188, it will be obvious that, when the latter is raised, the locking plates are also raised so that their lower ends are in a plane above the upper face of the locking nose 177 of the stationary block 176, thereby releasing the keyboard for shifting movement either to the right or to the left. During the shifting of the keyboard the shift lever 216 is locked in its forward position by means to be presently described.

It is desirable to shift the keyboard but one columnar space or position upon each operation of the shift lever 216, and the rocking plate 201 is employed for the purpose of automatically releasing the locking plates 178 from their elevated positions when the carriage or keyboard has been moved out of one columnar position and before it reaches the next adjacent columnar position to prevent the carriage from being moved more than one columnar space to the right or the left at a time. It will be seen from Fig. 19, that when the keyboard is locked in one of its columnar positions, the nose 177 projects into the recess between the two contiguous cam projections 204 on the rock plate 201, but that, when the keyboard is moved either towards the right or towards the left, the adjacent cam projection 204, towards the right or left as the case may be, engages the forward end of the nose 177, thereby rocking the rocking plate 201 counter-clockwise, (as viewed in Fig. 17), and as the upwardly extending arm 203 of the rock plate 201 carries the stud 200 projecting into the forked arm 199 of the latch 195, the latch is rocked clockwise, as viewed in Fig. 17, against the action of its spring 207, to carry its nose 194 out of engagement with the projection 193 on the bell-crank lever 187, whereupon the latter is released and the springs 183 for the locking plates 178 moves the latter downwardly to locking position. This release is effected during movement of the keyboard and before it reaches the columnar position to which it is being shifted, so that the lower end of the particular plate 178 above the nose 177, when the plates 178 are released, contacts with the upper face of the nose 177, and as the keyboard moves to and is arrested in its selected columnar position this lock plate slides off of the top of the nose 177 and then descends to its full limit so that it engages one side of the locking nose, the next plate, either to the right or left, dependent upon the direction of shift of the keyboard, being the one which contacts with the opposite side of the nose to arrest the keyboard. Therefore, the keyboard is locked from further shifting in either direction. When the keyboard has been moved to its desired columnar position, the keyboard shift lever 216 is then unlocked from its forward position and during its return movement the stud 215 rides off of the projection 220 of the cam plate 212, whereupon the latch spring 207 restores the latch 195 to its normal latching position with the arm 193, the latch being rocked to normal position by this spring 207 at the same time that the latch and plate 198 are elevated to normal position by the same spring.

*Means for moving the actuating members 38 to unobstructing positions when keyboard is shifted*

For the purpose of permitting the setting of the actuating members 38 to be trans-set from order to order and also to prevent the setting links 85, which remain in their differentially set condition during the entire computation, from contact with the actuating members 38 while the keyboard is being shifted, the actuating members 38 are rocked downwardly to their extreme positions,— slightly below the positions to which they are moved under the control of the "1" keys,— when the keyboard shift lever 216 is drawn forwardly, and the springs 42, connected to the supporting levers 40, rock the members 38 upwardly after the keyboard has been shifted to its new columnar position, the actuating members 38 in alignment with the trans-set differentially positioned studs 89 on the setting links 85 being then arrested thereby in the positions determined by the depressed keys and the remaining actuating members 38 being returned to normal zero position. In order to move the actuating members to their extreme lower position, we employ the following described mechanism, best illustrated in Figs. 3, 5, 15 and 17. A rock shaft 222 is supported at its ends in the side plates 53 and 54 of the auxiliary keyboard section and an arm 223 (Fig. 3) is mounted on the right-hand end of the shaft, while a lever 224 (Figs. 3, 15 and 17) is mounted on the left-hand end of the shaft, and the forward ends of the arm and lever are provided with forks 225 engaging over a cross-rod 226 supported in the upper ends of the vertically extending arms of bell crank levers 227 pivoted at 228 to the respective side plates 44 and 45. Connecting the rear ends of the horizontal arms of bell crank levers 227 is a universal rod 229 which extends over all of the actuating arms 38. The rear end of the crank lever 224 has a roller stud 230 projecting toward the left and into the path of the front face or edge 231 of the cam-plate 214. Normally, as shown in Fig. 15, the stud 230 rests against the lower portion of the front edge 231 and as the cam-plate 214 is rocked forwardly with the keyboard shift lever 216 to the position shown in Fig. 17, the edge 231 rocks the crank lever 224, shaft 222 and arm 223 in a clockwise direction, as viewed in Fig. 17, with the result of rocking the bell-crank levers 227 counter-clockwise, as viewed in the same figure, so that the universal rod 229 engages and rocks all of the actuating members 38 to their extreme lower positions and out of the path of movement of the lower ends of the setting links 85 when the keyboard is shifted to the next ordinal position. After the auxiliary keyboard has been shifted to its new position, the keyboard shift lever 216 and cam plate 214 are rocked backward to normal position, whereupon a spring 232, connected at its forward end to the frame of the machine and at its rear end to a cross-rod 233, carried by the bell-crank levers 227, restores the bell-crank levers 227 and the universal bar 229 to normal position and the springs 42, through their levers 40 and the studs 39, elevate the actuating members 38 to normal position unless they are arrested by the differentially positioned setting studs 89, as above explained.

*Locking means for keyboard shift lever 216*

As the actuating members 38 are to be retained in their extreme lower positions by the universal depressing bar 229 during the shifting of the auxiliary keyboard, the keyboard shift lever 216 is locked in its forward position during the shifting movement of the keyboard. To this end we provide a yoke-shaped bail 235, (Figs. 2, 3, 15, 17 and 21), the side arms 236 of which are mounted on the cross-shaft 104 supported in the partition plates 81. The bridge of the bail 235, as best shown in Figs. 2 and 21, rests upon the offset lips 184 of the keyboard locking plates 178 and is retained in this position by a spring 239 (Fig. 3) connected at one end to the right-hand arm of the bail 235 and at the other end to a stud on the side plate 54 of the keyboard section. A forward extension 243 of the left-hand arm 236 of the bail 235, as shown in Figs. 15 and 17, has pivoted thereon a pass-by pawl 241 having an offset lug 242 overlying and resting on the extension 243 and also having at its forward end and beyond the lug 242 an offset lug 244, projecting into the path of movement of the upper end of the cam plate 214 when the latter is rocked forwardly with the keyboard shift lever 216. On the forward stroke of the shift-lever 216, the upper end of the plate 214 engages the lower edge of the lug 244, thereby camming the pawl 241 counter-clockwise, as viewed in Fig. 17, against the tension of its spring 245, connected at opposite ends to the pawl and the arm 236. As soon as the upper edge of the cam plate 214 clears the lug 244 on the pass-by pawl 241, the spring 245 immediately restores the pawl to normal position with respect to the bail 235 to move its lug 244 behind the upper rear edge of the cam plate 214, thus preventing the return movement of this plate and shift lever 216. As above explained, the locking plates 178 are released from their elevated positions by the rocking of the rocking plate 201 and operation of the latch 195 during the shifting of the auxiliary keyboard, but downward movement of one of these plates is arrested when it engages the top of the locking nose 177 and it is not moved the rest of the way to its normal lower position until the keyboard has reached its new columnar position, at which time the plate slides off of the nose 177. As the bridge of the bail 235 normally rests on the lips 184 of the locking plates 178, the plates while in their elevated condition hold the bail in the position shown in Fig. 17, and after the locking plates are released the one, resting on top of the nose 177 during the remainder of the shifting movement of the keyboard, retains the bail in substantially the same position with the lug 244 of the pawl 241 in locking position in back of the upper end of the plate 214. When this arrested locking plate is finally moved to its normal position at the end of the shifting movement of the keyboard, the spring 239 Fig. 3 rocks the bail 235 and with it the pawl 241 to raise the lug 244 out of engagement with the rear edge of the cam plate 214 whereupon this plate and the keyboard shift lever 216 are rocked back to normal position by a coil spring 247 (Figs. 6 and 17), which is wrapped around the shaft 74 with one end bearing against one of the spacing bars for the partition plates 81 and its other end bent around the front edges of the shift lever 216 and cam plate 214.

Release mechanism for keys 26

After a computation has been completed, the depressed keys 26, set to represent the multiplicand or the divisor, as the case may be, are released by a restoring lever 250 to permit the restoration of the keys to normal elevated condition by their springs 71. The lever 250 (Figs. 1, 3 and 6) is mounted on the inner side of the right-hand side plate 53 of the keyboard section by a bolt 251, the lever being spaced from the plate 53 by a bushing. This lever is held in the normal position shown in Figs. 1 and 3 by a spring 252, connected at its opposite ends to the machine frame and the lower end of the lever. A stud 253 carried by the lever 250 normally engages the lower edge of a cam arm 254 projecting forwardly from the right-hand side of a yoke-shaped universal key-restoring bail 255, which is best shown in perspective in Fig. 12. The sides of the bail are pivoted on brackets 256, as best shown in Figs. 3 and 6, rigidly secured to the outer key-board plate 51. The bridge 258 of the key-restoring bail 255 normally engages the forward edges of vertical fingers 259 on the rear ends of the key-locking plates 58. It will be remembered, that when a key in the bank is depressed, the locking unit, comprising the pair of plates 58, is moved rearwardly and the forward end of the projection 106 of the corresponding locking bail 105 engages behind the rear edge of the vertical finger 107 of the yoke shaped restraining member 94, thereby rocking the member 94 to release the indexing stop member 75, as the locking plates 58 move slightly forward to lock the key in depressed position.

It will now be obvious that when the key restoring lever 250 is drawn forwardly, its stud 253, through its coaction with the cam arm 254 rocks the key-restoring bail 255 clockwise, as viewed in Figs. 3, 10 and 12, whereupon its bridge 258, through its engagement with the vertical ears 259 on the locking plates 58 moves the latter rearwardly to carry the forward edge of the particular effective locking lug 65 out of engagement with the shoulder of the projection 70 on the key which has been depressed, the spring 71 for the key then restoring it to normal undepressed condition. At the same time, the rear edge of the bridge 258 of the restoring bail engages vertical ears 261, projecting from the bridges of the locking yokes 105 to rock the latter clockwise, thereby elevating their projections 106 out of locking engagement with the fingers 107 of the restraining members 94, whereupon the latter are rocked clockwise by their springs 112 to normal position. When the bail 255 is rocked counter-clockwise upon return movement of the restoring lever 250 to normal position, the springs 60 for the locking units, comprising the plates 58, move them forwardly to normal position, the lower edges of the projections 106 on the bails 105 then sliding on the upper ends of the fingers 107 of the members 94.

The full forward and return movements of the restoring lever 250 are limited by a stud 263 on the lever which projects through a slot 264 in the right-hand side plate 53, the rear end of the slot acting as a limit stop for the lever in its normal idle position while the forward end of the slot, which is concentric with the pivot of the lever, limits the forward movement of the lever.

Restoration of the differential mechanism of the auxiliary keyboard

After the completion of a multiplying or dividing computation, the indexing stop members 75 and the associated parts, which have moved differentially under the control of the depressed keys, are restored to normal position upon operation of the key restoring lever 250 through the mechanism to be now described. Immediately adjacent the inner side of the right-hand plate 53 of the auxiliary keyboard and between this plate and the restoring lever 250, there is supported on a pin 267 (Figs. 1, 3 and 6) a cam-lever 268. The pin 263, projecting from the restoring lever 250, extends to the rear of the upper end of this cam lever. The lower end of the cam lever 268 is forked to engage over a stud 269 projecting from the right-hand end of a restoring bail 270 whose side arms 271 and 272 (Figs. 3, 8, 9 and 15) are supported on the cross-shaft 74, the side arms being connected by a universal bridge 273, which extends in front of the indexing stop members 75. A spring 274 (Figs. 1 and 3) is connected at one end to the lower end of the cam lever 268 and at its opposite end to a stud on the right-hand partition plate 81 and serves to normally retain the lever 268 and the restoring bail 270 in the normal position shown in Figs. 3, 8 and 15 in which position of the bail, the lower side of a forwardly projecting arm or extension of the left-hand arm 272 rests upon one of the spacing rods 82. From the above it will be seen that, when the restoring lever 250 is drawn forwardly, its stud 263, acting on the rear cam face of the cam lever 268, rocks the cam lever in a counter-clockwise direction, as viewed in Figs. 1 and 3, with the effect of rocking the restoring bail 270 in a clockwise direction through the action of the forked lower end of the cam lever on the stud 269, whereupon the bridge 273 of the bail engages shoulders 276 on the indexing stop arms 76 to restore the indexing stop members 75 and associated parts to normal position, with their upper extremities again locked behind the bridges of their respective yoke shaped restraining members 94. The upper rear edges of the arms 76 are curved to form cam surfaces so that, near the end of their restoring movement, by the restoring bail 270, the cam faces engage the under sides of the bridges of the restraining members 94 and rock them counter-clockwise about their supporting shaft 104, in order to permit the arms to pass to the rear, the members 94 being restored to their normal locking positions shown in Fig. 8 by their springs 112.

Near the beginning of the forward stroke of the restoring lever 250, for purposes of releasing the depressed keys and restoring to normal the differential mechanism of the keyboard section as described, the key restoring bail 255 (Figs. 10 and 12), as above explained, rocks the yoke-shaped members 105 to release the restraining members 94 which are then returned to their normal locking positions by their springs 112. This occurs before the restoring bail 270 has completely restored the indexing stop members 75 and as the locking segments 114, which were operated when the keys were depressed to release the restraining members 94, are restored to normal locking position when these members are restored to normal by their springs 112 upon restoration of the locking bails 105, it is necessary to again draw the locking segments 114 forwardly to move their locking noses 113 out of engagement with the upper edges of the bridges of the restraining members 94, as otherwise the upper ends of the arms 76 of the stop members 75, being restored, would engage these bridges which could not move out of the way because of the overlying noses 113, with the result that the machine would be locked against further operation. The provision for again rocking the locking segments 114 to release the members 94 and hence permit full return movement of the indexing stop members 75, comprises a yoke-shaped member 278 whose side arms 279 (Figs. 3, 8 and 10) are supported on the cross shaft 80, the side arms being connected by a bridge 281 so positioned in relation to the releasing segments 114 that it is normally above the rear inclined edge of a tooth 283 projecting from one of the projections formed by the notches 116 on each locking segment. As best shown in Fig. 3, the right-hand side arm 279 of the yoke-shaped member 278 is provided with an extension 285 having a cam slot 286 into which extends a pin 287 on the lower end of the restoring lever 250. The cam slot 286 is so designed that, near the beginning of the forward stroke of the restoring lever, the member 278 is rocked clockwise, as viewed in Figs. 3, 8 and 10, during which movement its bridge 281 engages the teeth 283, thereby drawing all of the locking segments 114 forwardly to withdraw their noses 113 from above the bridges of the yoke-shaped retaining members 94, so that when the stop arms 76, which have been differentially positioned, are being restored to normal position, they are permitted to wipe past the bridges of the members 94, as above explained, the segments 114 being held in their forward position by the member 278 until near the end of the return movement of the lever 250.

*Counter-mechanism*

We now come to the counter-mechanism, the counting wheels 30 of which function to display the multiplier at the end of a multiplying computation and the quotient at the end of a division computation, the counter-wheels being cleared or restored to zero before each computation or calculation is begun.

The housing (Figs. 1, 8 and 21) for the counter-mechanism comprises side walls 292, the integral connecting back panel 293 and a cover plate 294, covering the counter wheels and projecting down in front of the same, the cover plate being provided with the sight openings through which the operator may read the figures on the counting wheels representing the multiplier or quotient, as the case may be. The side of the housing is provided with lugs 296 bolted to the rear side of the square rod 99, which is secured at its end to the side frames 44 and 45 of the multiplying section. To more securely support the housing, there is provided a pair of brace rods 297 which, as best shown in Fig. 6, are secured at their outer ends to the respective side frames 44 and 45, and at their inner ends to the side plates 292 of the counter-housing. The cover-plate 294 is secured in place by screws 298 (Fig. 8) threaded into a cross-bar 299 secured at its ends in the side plates 292.

Within the cover plate 294 and supported on a shaft 300 (Figs. 3, 8, 21 and 22) are the six counting wheels 30 whose hubs 301 have secured thereon aligning wheels 302 and push or actuating ratchets 303 and 304, the aligning wheels and ratchets of each denomination being secured together by a pin, as shown in Fig. 22. The ratchet 304 is acted upon by its corresponding pawl 305 to turn the corresponding counter wheel clockwise, as viewed in Figs. 3 and 8, to indicate the number of strokes of the operating crank 29 taken in a multiplying operation when the auxiliary keyboard is in the columnar position or place corresponding to the order of the particular counter wheel, it being remembered that the crank is given a number of strokes in each ordinal position of the keyboard determined by the value of the digit in the corresponding order of the multiplier. Each ratchet 303 is acted upon by its pawl 306 to rotate its counter wheel counter-clockwise to indicate the number of strokes taken in a dividing operation while the auxiliary keyboard is in the columnar position corresponding to the order of the particular counter wheel, it being recalled that in each position of the auxiliary keyboard, the crank 29 is given as many strokes as the divisor is contained in the portion of the dividend (or remainder) shown on the accumulator wheels A in alignment with, and to the left of the banks of keys of the auxiliary keyboard. As shown in Figs. 18 and 21, the peripheries of the counting wheels are provided with two series of digits, the digits of each series increasing seriatum in both directions from "0" which is the common "0" point for both series. The digits in solid black lines are displayed through the sight openings to represent the multiplier, the wheels being turned backward or clockwise in multiplying operations, and the digits in double lines or skeleton are displayed to represent the quotient, the wheels being turned forward or counter-clockwise in dividing operations. The mounting of the actuating pawls 305 and 306 and the means for conditioning the pawls 305 or the pawls 306 for effective actuation in multiplying or dividing operations, respectively, will first be described and the mechanism for selecting the pairs of pawls 305 and 306 of each denomination for actuation, dependent upon the columnar position of the auxiliary keyboard, will be described later.

Positioned between the counting wheel units are partition plates 307, which at their lower ends are supported on a cross-rod 308 secured at its ends in the side walls of the counter casing and at their upper forward sides by the cross bar 299 which is positioned in the cut-out portions 310 of the partition plates and provided with spacing notches in which the upper and lower edges of the cutout portions engage. Directly beneath the aligning wheels 302 in each bank is a vertical plate 312 supported for up and down movement on a pair of parallel arms 313, the arms being pivoted at their forward ends to the plates 312 by pins or studs 314 and at their rear ends, which are yoke-shaped, on cross-rods 315 secured at their ends to the side plates of the counter housing and projecting through the partition plates 307. The pawls 305 and 306 of each pair are pivoted at 316 and 317 (Fig. 10) respectively, on the upper ends and on the opposite sides of their respective plates 312. Both pawls have offset lugs 318 projecting toward the left therefrom and connected to the ends of a spring 319 which tends to draw the upper ends of the pawls towards each other. The lower extensions of the pawls 305 and 306 for each denomination rest against cross-rods 320 and 321, respectively, which project through openings 322 and 323, respectively, in the side plates of the counter housing, holes 323 in the partition plates 307 also being provided for the rod 321. The function of the cross-rods 320 and 321 is to act on lower extensions of the pawls 305 and 306 in such a manner as to disable one or the other from turning the appropriate counter wheel when the corresponding plate 312 is moved upwardly, the plates 312 being selected for operation, as will be presently described, it being sufficient for the present to mention the fact that the plate of the denomination corresponding to the columnar position of the keyboard is the only plate which is reciprocated vertically upon each stroke of the operating crank 29. When the machine is set for multiplication (addition), the pawls 305 engage their ratchets 304 so that when the selected plate 312 is raised, its pawl multiplier 305 rotates the corresponding counter wheel clockwise one step, and while the companion or quotient pawl 306 is in this condition it is disabled from turning the counter wheel, yet it is so proportioned that the spring 319 draws it toward the left into the path of the teeth of its ratchet 303 near the end of the upward movement of the plate 312 and its nose contacts with one of the teeth and acts to prevent overthrow of the number wheel. This condition exists when the rod 320 is moved to the position shown in Fig. 10, in which the selected plate 312 is shown in its elevated position. The reverse condition exists when the cross-rods 320 and 321 are moved to the dividing (subtracting) condition shown in Fig. 8, as here it will be seen that when the plate 312 ascends the quotient pawl 306 will engage its ratchet 303 and turn its counting wheel in a counterclockwise direction, while the pawl 305 will prevent overthrow of the number wheel by engaging its ratchet 304 near the upper end of the movement.

As shown in Figs. 1, 3 and 6, provision is made for setting these cross-rods 320 and 321 for multiplication (addition) or division (subtraction) by means of the subtraction lever 32. This lever is provided between its pivoted point and its handle with a shouldered screw 325 secured in position by a nut and extending through a cam slot 326 formed in the forward end of a crank arm 327, fastened at its rear end on a shaft 328 which extends through the side-plates of the counter housing and is supported in suitable bearings thereon. Fast on the shaft 328 and immediately adjacent the outer sides of the side walls of the counter housing are a pair of bell crank levers 333, the arms of these levers having mounted at their outer ends the cross-rods 320 and 321. It will be seen that when the subtraction lever 32 is moved rearwardly to its adding (multiplying) condition the shouldered stud 325, moving upward in the cam slot 326, cams the crank arm 327 slightly counterclockwise with the effect of shifting the cross-rods 320 and 321 forwardly to the position shown in Figs. 1, 3 and 10 to disable the quotient pawls 306, except as overthrow preventing devices, and to render effective the multiplier pawls 305 so that when the selected plate 312 is elevated its multiplier pawl engages the ratchet wheel 304 and turns the corresponding number wheel one step to add "1" thereon.

When the subtraction lever 32 is drawn forwardly to its subtracting (dividing) position, shown in Fig. 8, its stud 325 moves to the lower end of the cam slot 326 and rocks the crank arm 327 in a slightly clockwise direction, thereby reversing the action of the cross-rods 320 and 321 and positioning them to disable the multiplier pawls 305, except as overthrow preventing devices and enabling the quotient pawls 306, so that when the selected plate 312 is raised its pawl 306 engages and rotates its ratchet 303 one step, thereby rotating the corresponding counter wheel one step in a counter-clockwise direction to add "1" thereon.

*Counter wheel selecting mechanism*

As above stated only the actuating plate 312 corresponding to the ordinal position of the auxiliary keyboard is raised during each cycle of operation, i. e., each stroke of the operating crank 29, the units plate being actuated when the keyboard is in its extreme right-hand or units position, the tens plate being actuated when the keyboard is in its next columnar position toward the left, and so on. The means for selecting the plate 312 to be actuated and for giving the plate its reciprocating motion will now be described, reference being had to Figs. 3, 8, 10 and 17.

Pivoted on the stud 314 on the lower end of each of the actuating plates 312 is a corresponding selector lever 334 forked at its lower end to provide a notch or recess 335. Connected at one end to a stud 336 on each selector plate and at its opposite end to a stud 338 on the adjacent partition plate 307 is a spring 339, the springs, there being one for each lever 334, serving to retain their respective levers 334 in the inoperative position shown in Fig. 8, with the exception of the selector lever of the order in which the counting is taking place. This particular selector lever is retained in its operative position through the engagement of its upper forward edge 340 with the rear face of a stud or button 341, fast to and projecting from the back panel 55 of the auxiliary keyboard section. When the auxiliary keyboard section is shifted from one columnar position to another, as above described, all of the selector levers 334 are rocked clockwise, as viewed in Figs. 8 and 10, to the position shown in Fig. 17, through mechanism to be presently described, and then are released after the keyboard has reached its new columnar position to permit their springs 339 to rock them back to normal position, except for the selector lever of the order corresponding to that of the position of the keyboard, which is arrested by its engagement with the rear face of the stud 341 to hold this particular selector lever in effective or operative position.

It will be recalled that the cross-rod 146 is raised and lowered during each stroke of the operating crank 29, the rod being secured at its ends to the lever 132 and the arm 133, the former being provided with the roller 156 which rides on the cam plate 129 rigid with the operating crank 29. When a selector lever 334 is in effective position, in which condition its forward edge 340 engages the rear end of the selector stud 341, its notch 335, formed in its lower end, is directly above the cross-rod 146, while the remaining selector levers have their lower ends to the rear of the vertical plane of movement of the cross-rod 146, so that when the cross-rod is elevated it engages in the notch of the selected lever only, thereby elevating the lever and its plate 312 together with the actuating pawls 305 and 306, the effective one of the pawls then rotating the corresponding counter wheel one step. It will therefore be seen that only the counting wheel 30 of the order associated with the selector plate 334 in contact with the selector stud 341 will be operated and that the counter-wheels will be rotated in one direction to display the multiplier by the full back line figures thereon in multiplying operations and in the opposite direction to display the quotient by the double line figures thereon in dividing operations.

For the purpose of accurately aligning or positioning the counter wheels, aligning arms 344, one for each counter wheel, are provided with studs 345 maintained in engagement with the notches of the aligning wheels 302 by means of springs 346 connected at their forward ends to the cross-plate 299 and at their rearward ends to lugs projecting from the yoke-shaped bearings of the arms by which the arms are pivotally mounted on a cross-rod 347 supported by the side plates of the counter housing and the partition plates 307. The springs 346 serve to retain the roller studs 345 in engagement with the notches of the wheels 302 to accurately position the counter wheels with their numbers in alignment with the sight openings.

When the auxiliary keyboard is shifted, it is necessary to rock the selector levers 334 so that their upper ends are out of the path of movement of the selector stud 341, in order to permit shifting of the keyboard and to enable the selector lever of the order, corresponding to the position of the keyboard, to be moved by its spring into engagement with the selector stud 341. To this end, there is mounted on the left-hand end of the cross-shaft 118 a bell crank lever 349 (Figs. 15, 17 and 21) whose forked forward arm is engaged by the stud 211 which, as above stated, project laterally from the cam plate 212. The rear edge of the downwardly extending arm of the lever 349 engages the forward edge of a connecting bridge 350 of a bail 351 whose side arms 352 are supported on the shouldered nut 135, threaded on the screws 134 upon which the hubs of the lever 132 and arm 133 are pivoted. The rear edge of the bridge 350 engages the forward ends of a pair of push rods 353 pivotally connected at their rear ends to the upwardly extending arms 354 of a Universal displacing bail 355 having a connecting bridge 356 which extends across and engages the lower rear edges of all of the selector levers 334. The bail 355 is pivoted on the cross-rod 308. The forward ends of the push bars 353 rest upon and are adapted to slide on the upper side of the guide plate 97 and in order to prevent vertical displacement of the forward ends of the push rods 353 each of them is provided with an extension 357 projecting from the forward end and extending under the bridge of the bail 351.

From the above it will be obvious that, when the cam plate 212 is depressed near the end of the forward stroke of the keyboard shift lever 216, through the coaction of the stud 215 on the cam edge 220 of the cam plate 212, as above described, the stud 211 rocks the bell crank 349 clockwise, as viewed in and to the position shown in Fig. 17, and its downwardly extending arm, being in engagement with the bridge 350, moves the latter rearwardly, pushing the two push bars 353 also rearwardly, thereby rocking the universal displacing bail 355 about its supporting shaft 308 and moving its connecting bridge 356 forwardly with the result of rocking the selector levers 334, to the position shown in Fig. 17, so that their upper ends are out of the path of movement of the selector stud 341 during shifting movement of the keyboard section. Upon return movement of the shift lever 216, the springs 339, connected to the selector levers 334 and studs 338 supported on the partition plates 307, serve to restore these levers and the bails 355 and 351 to normal position, which occurs after the keyboard reaches its new columnar position.

*Adding extra "1" on accumulator*

As above stated, in a dividing operation the subtracting driving arms 123 engage the differentially set actuating arms 38 to move the corresponding numeral wheels A of the accumulator extents complemental to the value of the depressed keys controlling the differential setting of the actuator arms 38, and that the lips or lugs 126 on the upper ends of the adding driving arms 121 engage the rear ends of the unset actuating arms 38 to add "9" on the corresponding numeral wheels A, "9" in this manner being added on each of the accumulator wheels A of those orders not represented by depressed keys on the auxiliary keyboard, and that in order to obtain the correct result it is necessary to add an extra "1" on the units numeral wheel A upon each stroke of the crank 29 in a division calculation. This extra "1" is added in the following manner. As this extra "1", when the machine is set for division, is to be automatically added on the accumulator at every stroke of the operating handle 29, the three-armed lever 132 is utilized for this purpose and to this end its central extension, as shown in Figs. 1 and 4, is provided with a roller stud 359, which when the machine is set for subtraction, engages in a notch 360 formed in the rear end of a link 361. The forward end of the link 361 is pivotally connected to the rear end of an operating bar 363, supported at its rear end on a flanged stud 364 projecting from the right-hand side frame of the calculator and projecting through a slot 365 in the bar. The forward end of the upper edge of the bar 363 is provided with a shoulder 366 and forwardly of the shoulder the edge is curved as at 367. The forward end 368 of the lower edge of the bar 363 is also curved and normally engages a stud 369, projecting from the right-hand frame of the calculator, to prevent displacement of the forward end of the bar. Fast on a bushing or sleeve 370 (Figs. 24 and 25), which forms a bearing for the right-hand end of the accumulator shaft, and adjacent to the outer side of the calculator side frame is a five-toothed or studded wheel 371 comprising a disc 373 fast on the bushing 370, five studs 374 equally spaced thereon and a second disc 375 having its inner face engaging the ends of the studs 374 and its central portion concaved to lie flush against the central portion of the disc 373 and held in place by a screw 376 threaded into the end of the bushing 370.

This bushing 370 has fast on its flanged inner end a plate or lever 380 (Figs. 24 and 25), slotted at 381 for the reception of a stud 382 projecting from a disc 383, which is provided with five studs $e'$, each equally spaced and projecting toward the left in the same manner as the studs $e$ on the internal gear plates C, the disc 383 being substituted in the present machine for the units gear plate C of the Horton patent. A spring 385, connected at one end to an extension 386 of the plate 380 and at its opposite end to a stud 387 projecting from the right-hand side of the disc 383, serves as a yielding connection between the plate 380 and the disc 383. As the disc 383 is fast on the hub of the units sun gear E and the bushing 370 with its plate 380 and wheel 371 are independently mounted, it will be seen that the spring acts as a connecting link between these two units.

When the machine is set for division, the rear end of the link 361 is lowered, as will be described presently, so that the notch 360 engages over the stud 359 on the three-armed lever 132, and as the lever 132 is rocked forward, that is counterclockwise, as viewed in Figs. 1 and 4, upon each rotation of the crank handle 29, as above described, the link 361 and hence the operating bar 363 are first moved forwardly and then rearwardly. During each forward movement of the bar 363, its curved edge 367 rides on the particular stud 374 in engagement with it, without effect until after the shoulder 366 has passed beyond this stud, at which time a spring 378, connected at one end to the bar 363 and at its opposite end to a back-stop pawl 379, draws the bar upwardly about its pivot on the link 361 so that its hook 366 engages said stud, as shown in Fig. 4. The pawl 379 engages successively behind the studs 374 to prevent backward or clockwise movement of the wheel 371. During return rearward movement of the bar 363, when the three-armed lever 132 is returned to normal position by its spring 155, the shoulder 366 through its engagement with the stud 374 rotates the wheel 371 and the plate 380 one-fifth of a revolution in a counterclockwise direction, and as the spring 385 is the connecting member between the plate 380 and the disc 383, it will cause the latter to rotate one-fifth of a revolution with the disc 383. As the unit sun gear E is rigid with the disc 383, it also will rotate one-fifth of a revolution in a counterclockwise direction and will impart a clockwise movement to the planet gear D, with the effect of turning the numeral wheel A of the unit bank one-tenth of a revolution in a clockwise direction to add "1" thereon. From the above description, it will be seen that adding "1" in this manner on the units numeral wheel A is somewhat similar in action to a carrying operation from one numeral wheel A to the one of next higher order. In place of employing the stationary units sun gear E of the Horton patent, this sun gear in our machine, as just described, moves with the studded disc 383, which is employed in place of the units gear plate C of the Horton patent. Hence when the disc 383 and sun gear E are rotated one-fifth of a revolution, the planet gear D in mesh with it is advanced to effect the one-tenth rotation of the units numeral wheel A to add the extra "1" thereon.

The slot and pin connection 381 and 382 is employed between the plate 380 and the disc 383 to permit the slight clockwise movement of the disc 383 by its arm 2, while the accumulator is being cleared to turn its numeral wheels to "0". As more fully described in said Horton patent, the ends $2^a$ of the arms 2 have cam edges $2^b$ and in the first part of the zeroizing operation by the hand crank W, these levers are drawn forwardly by the rod 6 and the cam edges $2^b$ engage the studs $e$ on the gear discs C so as to rotate the latter in a clockwise direction, as illustrated in Fig. 8 of the Horton patent, and rotate the gear carriers L in the same direction, thus swinging the upper ends of the levers H forwardly to move their studs $H^2$ out of engagement with the cams G for the purpose of eliminating the friction between the studs $H^2$ and the cams G. When the arms 2 are thus rocked forwardly, the cam edge $2^b$ on the units arm 2 engages one of the studs $e'$ on the disc 383, hence rotating the latter slightly clockwise and moving its stud 382 in the slot 381 of the plate 380, which cannot be rotated backward because of the backstop pawl 379 (Fig. 4) which prevents backward (clockwise) movement of the wheel 371 and hence of the plate 380 rigid therewith.

During a multiplying calculation, the rear end of the link 361 is in its elevated position, shown in Fig. 1, with the slot 360 out of engagement with the actuating stud 359 on the lever 132, so that the above described mechanism for adding the extra "1" in dividing operations is not operated during a multiplying operation. When the subtraction lever 32 is moved to its subtracting (dividing) position, the rear end of the link 361 is lowered to move its notch 360 into engagement with the stud 359, so that upon each stroke of the crank 29 in a dividing calculation, the extra "1" will be added on the units numeral wheel A. To enable the link 361 when the machine is conditioned for dividing, and disable it when the machine is in condition for multiplication, the lower extension of the subtraction lever 32 is pivoted to the rear end of link 390 (Figs. 3, 8 and 13) which at its forward end is provided with a pin 391 projecting through a hole 392 in the left-hand side frame 45 of the multiplying section and which also is connected to the upper end of a crank arm 393 fast to a cross-shaft 394 journaled at its ends in the side frames 44 and 45. Fast on the right-hand end of the shaft 394 and just within the right-hand side frame 44 is a corresponding arm 395 (Figs. 1 and 13) which at its upper end is provided with a stud 396 projecting through a hole 397 in the side frame 44. A downward extension 398, projecting from the lower edge of the link 361, has a cam faced lower edge 399 supported on the projecting end of the stud 396. When the subtraction lever 32 is in its adding (multiplying) condition, shown in Fig. 1, the stud 396 engages the high forward end of the cam face 399 so that the rear end of the link 361 is elevated with its notch 360 out of engagement with the operating stud 359, thereby rendering ineffective the link 361 for adding the extra "1". When the subtraction lever 32 is shifted forward to its subtracting position, the stud 396 is drawn rearwardly to the position shown in Fig. 4, at which time it is engaged by the lower rear end of the cam face 399, thereby permitting a spring 400, connected at one end to the link 361 and at the opposite end to a frame stud, to draw the rear end of the link downwardly, thereby engaging the notch 360 with the operating stud 359, so that upon each revolution of the operating handle 29, the link 361 and operating bar 363 are reciprocated to add the extra "1" on the units accumulator wheel A.

*Zeroizing of the counter wheels 30*

At the end of each multiplying or dividing calculation, or before the machine is used to perform a new problem, the counter wheels 30 are turned to zero. For this purpose, each of the counting wheels 30 has pivoted on its inner side, a pawl 404 (Figs. 21, 22 and 23) having a spring 405, connected to its free end, which acts to depress the nose 406 of the pawl into engagement with a corresponding recess 407 in the hub of the wheel 30. As above stated, the counting wheels are mounted on the shaft 300 which is provided at its left-hand end with a flange 408 from which projects toward the right a stud 409. Normally this stud engages in an opening 410 in the left side wall of the counter housing, as shown in Fig. 21, and acts as a "0" positioning means in a zeroizing operation of the counter. Normally, the noses 406 of the pawls 404 rest on the periphery of the shaft 300 and as the number wheels 30 are rotated clockwise in an adding operation and counter-clockwise in a subtracting operation, the pawls have no effect as their noses merely ride freely on the periphery of the shaft. When, however, the shaft is pushed toward the left by the hand knob 411 on its right-hand end and against the tension of its spring 412, coiled about the shaft between the right-hand side of the counter-housing and hub of the knob, the stud 409 moves out of the opening 410 and shouldered recesses 413 in the shaft 300 are moved into the path of the noses 406 of the pawls, one side of the recesses being shouldered so that when the shaft 300 is rotated clockwise, as viewed in Fig. 23, by the knob 411, these shoulders pick up the pawls and restore the numeral wheels to "0". When the wheels arrive at "0" position the spring 412 moves the shaft 300 to the right moving its recesses 413 out of alignment with the pawls 404 and moving the stud 409 into engagement again with the opening 410.

*Operation*

The operation of the machine is obvious, in view of general explanation of the manner of using the machine to perform the simple multiplying and dividing problems, discussed early in this specification and in view of the detailed description of the construction and operation of the various mechanisms, so that now it will only be necessary to recapitulate by explaining in a more or less general way the operation of the machine in performing more complicated multiplication and division problems.

Let it be assumed that 345 is to be multiplied by 402. The keys on the auxiliary keyboard are depressed to represent the multiplicand 345, which results in releasing the indexing stop members 75, for the units, tens and hundreds banks, movement of these members being arrested by the depressed keys in the corresponding banks. The differential movement of these indexing stop members is transmitted to the units, tens and hundreds actuating members 38, respectively, the auxiliary keyboard section having been moved to its extreme right hand or units position before the keys were depressed, if it was not already in such position. The machine is conditioned for multiplication, if it is not already in such a condition, by moving the subtraction lever 32 to its adding (multiplying) position. The adding driving arms 121 are then in operative alignment with the actuating members 38, so that upon each stroke of the operating crank 29, the adding arms 121 for the tens, units and hundreds denominations engage their differentially set actuating members 38 to move the same forwardly. The "5" notch (Fig. 10) on the units arm will engage the ear 125 on the units actuating member 38, the "4" noted on the tens driving member will engage the ear on the tens actuating member 38, and the "3" notch on the hundreds arm 121 will engage the ear on the hundreds actuating member 38, so that these arms and hence the actuating units of the calculator, are moved forwardly and rearwardly corresponding extents, upon each stroke of the operating crank 29 to add "345" on the accumulator. As 345 is to be multiplied by 2, that is the value of the digit in the units order of the multiplier, the crank 29 is given two strokes and the numeral wheels A will read 690. The auxiliary keyboard section is now shifted to the left one place or order by moving the keyboard shift lever 216 forwardly, and then shifting the keyboard section manually, the lever being locked in its forward condition until the keyboard has reached its second ordinal position, whereupon the locking plates 178, which were raised during the forward stroke of the shift lever and released through the camming action of the locking block 176 and rocking plate 201 during such movement of the keyboard section, lock the keyboard section in its second position. At the end of the shifting movement of the keyboard section, when all of the locking plates 178 have reached their lower normal positions, the locking pawl 241 is raised to move its lug 244 from behind the plate 214, whereupon the restoring spring 247 restores the keyboard shift lever 216 and the plate 214 to normal position. Now as the figure in the tens order of the multiplier is "0", the crank 29 is not to be operated while the keyboard section is in the tens or second position. Therefore, the keyboard shift lever 216 is again operated to permit the manual shifting of the keyboard section one place or step further toward the left to its third or hundreds position. Each time the keyboard is shifted, the multiplicand is trans-set one order or place towards the left, all of the actuating members 38 being depressed by the universal rod 229 during the shifting of the keyboard, so that they are in non-obstructing position, and the members 38, one order to the right of the members 38 actuated while the keyboard was in the position from which it is being shifted, are arrested by the differentially positioned studs 89 on the setting links 85 when the keyboard shifting lever 216 is restored to normal. While the keyboard is in its third position, the crank 29 is given four strokes, as the digit "4" appears in the hundreds order of the multiplier, "34500" being added upon the accumulator during each of these strokes, so that at the end of the fourth stroke the numeral wheels will read "138690" which is the correct product of 345 multiplied by 402.

It will be understood that, during each of these strokes, the "5" notch on the hundreds adding driving arm 121 engages the ear 125 on the hundreds actuating member 38, and that the "4" notch on the thousands arm 121 and the "3" notch on the tens of thousands arm 121 engage the ears 125 on the respective actuating arms 38 to move them corresponding extents and hence add "34500" on the accumulator.

While the keyboard section was in its first or units position, the units selector lever 334 was in operative condition, as its forward upper edge 340 engaged the rear face of the selector stud 341, and as the machine was conditioned for multiplication, the multiplier pawls 305 were rendered effective, so that upon each of the two strokes of the operating crank, with the keyboard in the units position, the units counter wheel 30 was advanced one step and at the end of the second stroke, the digit "2" of the series of full black line digits on the counting wheel was displayed through the sight opening. While the keyboard was in its second or tens position, the crank was not operated and therefore the tens counter wheel 30 was allowed to remain at "0". When the keyboard was shifted to its third or hundreds position, the hundreds selector lever 334 was rendered effective, so that upon each stroke of the crank with the keyboard in this position, "1" was added on the corresponding counter wheel, which at the end of the fourth stroke displayed the full line digit "4". Hence the correct multiplier, "402" is shown by the counter, the operator thus having, during the operation, a visual indication of the number of strokes in each order, to assist him in taking the correct number of strokes without the necessity of mentally counting them.

Assume, now, that the machine is used for performing a division calculation and that 183,314 is to be divided by 456. The subtraction lever 32 is moved from its adding (multiplying) to its subtracting (dividing) position, whereupon its roller stud 170 (Fig. 13) moves in the slot 169 to move the frame, supporting the adding and subtracting driving arms 121 and 123, toward the right so that the adding arms are shifted out of operative alignment with the actuating arms 38 and the subtracting arms 123 are moved into such operative alignment. The accumulator and the counter are both cleared, so that the numeral wheels of both display "0's" through their respective sight openings. The key-restoring lever 250 is also given a stroke, and upon its forward movement the bail 255 is rocked to move the key-locking plates 58 rearwardly for the purpose of releasing the previously depressed keys, and at the same time the restoring bail 270 is rotated clockwise through the cam lever 268, operated upon by the stud 263 on the restoring lever 250, to restore the indexing stop members 75, positioned differentially in the previous computation, and the corresponding setting links 85 to normal "0" position. The calculator keys 27 are now operated to register in the usual manner, on the accumulator wheels A, the dividend 183,314. The divisor 456 is then set up on the auxiliary keyboard. The operator will now observe that the divisor "456" is not contained in that portion of the dividend represented by the three digits of highest orders, this portion being "183". He will therefore shift the auxiliary keyboard to the hundreds position (if it is not already in that position) and it will then be obvious that "456" is contained in the four highest digits, "1833", of the dividend. The operator now operates the crank 29 and at or near the end of each rotation thereof, notes the remainder on the accumulator numeral wheels of higher order than the tens wheel, to see if the divisor is contained in each successive remainder. During each of these strokes, the "3", "4" and "5" indexing notches on the hundreds, thousands and tens of thousands subtracting dividing arms 123, respectively engage the ears 125 on the differentially set actuating members 38 of the respective denominations to move these arms forwardly extents corresponding to the value of the respective notches, or, in other words, extents complemental to the value of the respective keys controlling the setting of the members 38, subtraction, as explained above, being accomplished by adding the complement of the subtrahend (divisor). At the same time the ears 126 on the adding arms 123 for the other (higher and lower) denominations, engage the notches in the rear ends of the unset actuating members 38 for such denominations to move the arms forwardly 9 steps and hence add "9" on each of the corresponding numeral wheels A. Also during each stroke, the mechanism (Figs. 1, 4, 24 and 25) for adding the extra "1" on the units numeral wheel A of the accumulator is operated, as the link 361 was depressed, when the subtraction lever 32 was moved to subtracting position, to lower its notch 360 into engagement with the stud 359 on the lever 132. At the end of the fourth stroke of the crank, with the keyboard in its third position, the operator will note that the divisor is not contained in the remainder on the numeral wheels in alignment with the banks of auxiliary keys, this remainder now being "419", so he shifts the keyboard one step toward the right to its tens or second position and notices that the remainder on the numeral wheels in alignment with the banks of keys of the auxiliary keyboard still does not contain the divisor, so he moves the auxiliary keyboard one step further toward the right to its first or units position, and operates the crank 29, it being obvious that the divisor is then contained in the entire remainder on the accumulator. When the keyboard is shifted each time one place to the right, the divisor is trans-set one order to the right, in the same manner as the multiplicand is trans-set one order towards the left when the keyboard is shifted one place towards the left. With the keyboard in its units position the crank 29 is given one stroke, and at the end of the stroke, it is noted that the remainder, "458", on the accumulator is larger than the divisor, so that another stroke of the crank is taken, leaving a remainder of "2" on the accumulator. During each of these two strokes, the units, tens and hundreds actuating members 38 are moved 3, 4 and 5 steps respectively by their subtracting driving arms 123, while the members 38 of higher orders are moved 9 steps by their adding driving arms 121, an extra "1" also being added on the units numeral wheel A.

While the auxiliary keyboard was in its hundreds position, the hundreds selector lever 334 was in operative condition and, as the quotient pawls 306 were conditioned for operation when the subtraction lever 32 was shifted to subtracting position, the hundreds counter wheel 30 is given one step of movement upon each stroke of the crank, the wheel being rotated counter-clockwise so that at the end of the fourth stroke the numeral "4" of the quotient series of skeletonized digits on the wheel is displayed through its sight opening. While the keyboard was in its tens position the crank was not operated, so the units or tens counter wheel was not disturbed, its "0" being displayed through its sight opening. While the carriage was in its units position, the crank 29 was given two strokes and hence the units counter wheel 30 was rotated two steps to display the skeletonized digit "2", the quotient "402" being now displayed by the counter, with a remainder of "2" on the accumulator.

It will now be seen that the above described constructions are well calculated to accomplished the objects, primarily stated. At the same time it is to be understood that these constructions are susceptible of considerable modification without departure from the scope and spirit of the invention and consequently in the claims which follow the essential elements are recited without limitations to details of construction.

We claim:

1. In a machine of the class described, the combination of an accumulator, actuators therefor, differentially settable members associated with said actuators for moving them, means for differentially setting said members, a pair of complementally arranged elements for each member, said elements selectively coacting with said members to move the actuators proportional or complemental to the differential setting of said members, means for selecting the elements for effective operation, and means for moving said complemental elements.

2. In a machine of the class described, the combination of an accumulator, actuators therefor, differentially settable members associated with said actuators, means for differentially setting said members, pairs of complementally arranged elements for driving said members and actuators differentially, means for selecting said elements for effective operation, and means for giving said elements invariable extents of movement at each operation.

3. In a machine of the class described, the combination of an accumulator, actuators therefor, differentially settable members associated with said actuators, banks of keys having connections for differentially setting said members, pairs of complementally arranged elements for selectively driving said members and actuators, means for selecting said elements for effective operation, and means for giving said elements invariable extents of movement at each operation.

4. In a machine of the class described, the combination of a differential mechanism, means for controlling the differential setting of part of said mechanism, complementally arranged driving arms for selectively engaging such positioned part and moving said differential mechanism proportional or complemental to the setting of such part and means for selecting said driving arms for effective operation.

5. In a machine of the class described, the combination of an actuator, a differentially settable member associated therewith, means for differentially setting said member, a pair of complementally arranged arms pivoted to swing in opposite arcuate directions, said arms being selectively movable to position to coact with said differential member to operate the actuator, means for selecting said arms for effective operation, and means for moving said arms.

6. In a machine of the class described, the combination of an actuator, a differentially settable member associated therewith, a pair of arms complementally arranged by being pivoted at opposite ends and adapted to cooperate with said member to actuate the actuator, means for selecting the arms for effective operation of the actuator, and means for giving the arms invariable extents of movement.

7. In a machine of the class described, the combination of an accumulator, a differential actuator therefor, a differentially settable member cooperating with said actuator, a pair of driving arms pivoted at opposite ends and each having digital notches complementally arranged with respect to those on the other arm for engaging said member to actuate the actuator differentially, means for selecting the arms for effective operation, and mechanism for giving said arms constant extents of movement.

8. In a machine of the class described, the combination of an accumulator, actuators therefor having differentially settable portions, a driving adding element for each actuator, a driving subtracting element for each actuator complementally arranged with respect to said driving adding element, said elements being adapted to selectively engage the differentially settable portions of said actuators, means for selecting said adding and subtracting elements for effective operation, a carriage shiftable relative to said driving elements, and manipulative devices on said carriage for controlling the differential setting of said portions of said actuators for engagement by said driving elements.

9. In a machine of the class described, the combination of an accumulator, actuators therefor having differentially settable portions, a driving adding element for each actuator, a driving subtracting element for each actuator complementally arranged with respect to the adding element, said elements being adapted to selectively engage the differentially settable portions of said actuators, means for selecting said adding and subtracting elements for effective operation, and a keyboard having banks of depressible keys, said keyboard being ordinarily shiftable relative to said driving elements and said keys having connections for controlling the differential setting of said portions of said actuators to determine the extent of movement of said actuators when driven by said driving elements.

10. In a machine of the class described, the combination of an accumulator, differential actuators therefor, a differentially settable member for each actuator, an adding element and a subtracting element for each actuator complementally arranged for coacting with the respective differentially settable members, means for selecting the adding and subtracting elements for effective operation, and an ordinary shiftable keyboard, for differentially positioning said members.

11. In a machine of the class described, the combination of an accumulator, an actuating mechanism therefor, means for controlling the differential movement of said actuating mechanism, a pair of driving arms pivoted at opposite ends to swing in opposite angular directions and each provided with a series of digital notches, the notches of one being complementally arranged to those of the other, means for swinging said arms to move the differential mechanism differentially, and means for selecting the arms for effective operation.

12. In a machine of the class described, the combination of an accumulator, actuating mechanism therefor, means for controlling the differential movement of said actuating mechanism, means for setting parts of said actuating mechanism differentially, a pair of driving arms positioned in the rear of said actuating mechanism and pivoted at their outer ends to swing in opposite angular directions, said arms being provided on their front edges with series of notches complementally arranged with respect to each other, common means for swinging said arms invariable extents to engage said differentially positioned parts and move the actuating mechanism differentially, and means for selecting the arms for effective operation.

13. In a calculating machine, the combination of an accumulator, actuators therefor, differentially settable operating members connected to said actuators, a keyboard including depressible keys having connections for differentially setting said operating members, said keyboard being shiftable to trans-set the setting of said members, and driving means coacting with said operating members for driving said members distances controlled by the differential setting of said operating members.

14. In a calculating machine, the combination of an accumulator, actuators therefor, differentially settable members associated with said actuators, a keyboard comprising manipulative devices for controlling the setting of said members and shiftable to ordinally trans-set the settings of said members, and means for moving said members to a constant position to permit their settings to be trans-set when the keyboard is shifted.

15. In a calculating machine, the combination of an accumulator, actuators therefor, differentially settable members associated with said actuators, a keyboard comprising manipulative devices for controlling the setting of said members, and shiftable to ordinally trans-set the settings of said members, and means for moving said members to their extreme positions and then permitting their setting under the control of the keyboard when the keyboard is shifted.

16. In a calculating machine adapted to perform subtraction by adding the complement of one of the factors, the combination of an accumulator having a plurality of orders, an actuator for each order of the accumulator, a differentially settable member for each actuator, complemental driving elements for each member, manipulative amount determining devices having connections for setting said members to determine the extent of movement of the actuators under the action of the driving elements, means for setting said complemental driving elements to cause them, when operated, to move the actuators in orders in which amount determining devices have been manipulated distances complemental to the setting of said devices, said driving elements having provisions for automatically moving the actuators nine steps in orders in which no devices have been manipulated.

17. In a calculating machine adapted to perform addition and substraction, the combination of an accumulator, actuators for said accumulator, a differentially settable member for each actuator, complemental driving elements, one set of said elements being for performing addition and the other for performing subtraction, means for selectively positioning said addition and said subtraction driving elements for engagement with said members, actuating means for said driving elements, manipulative amount determining devices for differentially setting said operators to control the extent of movement of said actuators by said driving elements, said addition driving elements having connections acting automatically, when the driving elements are operated with the subtraction driving elements in operative position, to move the actuators nine steps in orders in which no amount determining devices have been manipulated, and means conditioned by the means for selectively moving said subtracting driving elements to operative position for automatically adding "1" to the units order of said accumulator when the machine is operated.

18. In a calculating machine adapted to perform division by successively adding the complement of the divisor and trans-setting the divisor ordinally, an accumulator comprising a plurality of wheels, an actuator for each accumulator wheel, amount-determining setting devices for controlling said actuators in multiplying and dividing operations, adding elements for driving only those actuators to be controlled by the setting devices set to represent the multiplicand, and subtracting elements for driving only those actuators to be controlled by the setting devices set to represent the divisor, the actuators to the right of the last mentioned actuators being given nine steps of movement by their corresponding adding driving elements when the machine is operated to perform division.

19. In a calculating machine, the combination of an accumulator, actuators therefor, adding elements for driving said actuators differentially to perform addition, and subtracting elements complementally arranged with respect to said adding elements for driving the actuators differentially to perform subtraction by adding the complement of the subtrahend, said adding driving elements also being adapted to move the actuators, for those denominations which are not represented by digits in the subtrahend, nine steps.

20. In a machine of the class described, the combination of an accumulator, actuators therefor, differentially settable members associated with the respective actuators, amount-determining setting means for controlling the differential positioning of said members, a pair of complementally arranged adding and subtracting elements for each actuator for driving the actuators through said members, means for selecting said elements for effective operation, and means on the adding elements for moving the unset members and their corresponding actuators nine steps when the subtracting elements are in effective position.

21. In a machine of the class described, the combination of an accumulator, actuators therefor, differentially settable members associated with the respective actuators, amount-determining setting means for controlling the differential positioning of said members, a pair of complementally arranged adding and subtracting elements for each actuator for driving the latter through said members, means for shifting said elements to bring the adding or subtracting elements into cooperative relation with said members, differentially set, and projections on the adding elements extending substantially in the plane of the subtracting elements for moving the unset members nine steps when the subtracting elements are in cooperative relation.

22. In a machine of the class described, the combination of an accumulator, actuators therefor, differentially settable members associated with the respective actuators, amount-determining setting means for controlling the differential positioning of said members, mechanism for driving the members and actuators differentially in an adding operation, means for driving the set members and corresponding actuators differentially in a subtracting operation, and means on the first-mentioned driving mechanism for driving the unset members and corresponding actuators nine steps in a subtracting operation.

23. In a machine of the class described, the combination of an accumulator, actuators therefor, amount-determining setting means for controlling the differential movement of said actuators, a pair of adding and subtracting driving arms pivoted at opposite ends for actuating each actuator differentially, means for selecting said arms for effective operation, and means on the adding arms for giving the actuators nine steps of movement when the same are to be moved to said extent in a subtracting operation.

24. In a machine of the class described, the combination of an accumulator, an actuator therefor, a differentially settable member associated therewith, an adding arm pivoted at one end and adapted to cooperate with said member to drive the actuator differentially in an adding operation, a subtracting arm pivoted at its opposite end and adapted to cooperate with said member when the latter is moved out of normal position, means for shifting said arms to bring one or the other into cooperative relation with said member, and means on the outer end of the adding arm for cooperating with said member when the same is in normal position in a subtracting operation.

25. In a machine of the glass described, the combination of an accumulator, an actuator therefor, a differentially settable member associated with the actuator, an adding arm pivoted at one end and adapted to cooperate with said member to drive the actuator differentially in an adding operation, a subtracting arm pivoted at its opposite end and adapted to cooperate with said member when moved out of normal position, means for shifting said arms to bring one or the other into cooperative relation with said member, means on the outer end of the adding arm for cooperating with said member to move the same nine steps when the member is in normal position in a subtracting operation, and common operating mechanism for giving both of said arms invariable extents of movement upon each operation.

26. In a machine of the class described, the combination of an accumulator, an actuator therefor, a differentially settable member pivotally associated with said actuator, amount-determining manipulative means for controlling oscillation of the member to different extents, and a driving element for reciprocating said member, coacting means on the element and member being provided to automatically maintain the differential adjustment of the member when reciprocated.

27. In a machine of the class described, the combination of an accumulator, an actuator therefor, a differentially settable member pivotally associated with said actuator, a spring normally maintaining said member in normal position, amount-determining manipulative means and connections for swinging said member differentially, a driving element for bodily moving said member, and coacting notch and engaging means on said element and member for automatically maintaining said member in its adjusted position during its actuation by said driving element.

28. In a machine of the class described, the combination of an accumulator, an actuator therefor, a differentially settable member pivotally associated with said actuator, a spring normally maintaining said member in normal position, amount-determining manipulative means and connections for swinging said member differentially, a driving element for bodily moving said member, in one direction, and coacting notch and engaging means on said element and member for automatically maintaining said member in its adjusted position during its actuation by said driving element, said spring serving to move said member bodily in the opposite direction and swing it to normal position.

29. In a machine of the class described, the combination of an accumulator, actuating mechanism therefor including a differentially settable member, a spring tending to maintain said member in normal position, a pair of driving arms, complementally arranged and each having a series of notches for engaging said member to reciprocate the same, the notches automatically serving to maintain the engagement in opposition to said spring, amount-determining manipulative means for controlling the extent of movement of said mechanism, and means for selecting said arms for effective operation.

30. The combination in a calculating machine of an accumulating mechanism, complemental sets of driving elements for actuating said mechanism, means for selectively determining which of said sets of elements shall actuate said accumulating mechanism, a single set of differentially settable members with which said sets of driving elements are adapted to engage and by means of which the extent of actuation of said accumulating mechanism by said driving elements is determined, and manipulative amount determining devices for differentially setting said members.

31. The combination in a calculating machine of an accumulating mechanism, a set of stepped driving elements for actuating said mechanism, a set of complementally stepped driving elements for said mechanism, means for selectively determining which of said sets of elements shall actuate said mechanism, a single set of differentially settable members with which said sets of driving elements are adapted to engage and by means of which the extent of actuation of said accumulating mechanism by said driving elements is determined, and depressible keys and connections for differentially setting said members.

32. In a machine of the class described, the combination of an accumulator, actuators therefor having differentially settable portions, a driving adding element for each actuator, a driving subtracting element for each actuator complementally arranged with respect to said driving adding element, said elements being adapted to selectively engage the differentially settable portions of said actuators, means for selecting said adding and subtracting elements for effective operation, means for setting the differentially settable portions of said actuators to control the extents of movement of said actuators when driven by said elements, and means for effecting relative ordinal shifting between said manipulative means and said elements.

33. The combination in a calculating machine of an accumulator, a set of adding driving elements for operating said accumulator, a set of subtracting driving elements for said accumulator complemental to said adding elements, means for selectively determining which set of said elements shall operate said accumulator, a single series of differentially settable members adapted to be engaged by said driving elements when moved to operate the accumulator, and means for differentially setting said members.

34. The combination in a calculating machine of an accumulator, reciprocatory actuators therefor, differentially settable members associated with to said actuators, means for normally urging said members to a raised position, pivoted driving arms having invariable arcs of movement positioned to engage said members, and manipulative amount determining devices for depressing said pivoted members to differential positions at varying distances from the pivots about which the driving arms swing to cause said members to be engaged by said driving arms at different points in their arcs of movement to differentially move the actuators.

35. The combination in a calculating machine of an accumulator, reciprocatory actuators therefor, differentially settable members pivoted to said actuators, a set of driving arms for engaging said members, a complemental set of driving arms for engaging said members, manipulative amount determining devices for differentially positioning said members to cause them to be engaged by said driving arms at different points in the paths of movement of the latter, means for selectively choosing which of said sets of driving arms shall engage the members, and means carried by said complemental set of driving arms for moving through a full stroke of movement all of said members which have not been positioned by the amount determining devices.

36. In a machine of the class described, the combination of an accumulator, actuators therefor, a differentially settable member for each actuator, means for differentially setting said members, a pair of driving arms for each member, one arm of each pair having digital notches complementally arranged with respect to the notches of the other arm, said arms being selectively settable to positions for engaging said members to drive them, means for selecting said arms, and means for actuating the selected arms.

CLAIBORNE W. GOOCH.
ERNEST RACZ.